US011961068B2

(12) United States Patent
Kilroe et al.

(10) Patent No.: US 11,961,068 B2
(45) Date of Patent: Apr. 16, 2024

(54) CRYPTOCURRENCY SYSTEM

(71) Applicant: NEWTOWN PARTNERS (PTY) LTD, Cape Town (ZA)

(72) Inventors: James Alexander Gibson Kilroe, Cape Town (ZA); Vinodan Karthikeya Lingham, Los Altos, CA (US); Llewellyn Claasen, Parklands (ZA)

(73) Assignee: NEWTOWN PARTNERS (PTY) LTD, Cape Town (ZA)

( * ) Notice: Subject to any disclaimer, the term of this patent is extended or adjusted under 35 U.S.C. 154(b) by 615 days.

(21) Appl. No.: 16/644,128

(22) PCT Filed: Sep. 4, 2018

(86) PCT No.: PCT/IB2018/056739
§ 371 (c)(1),
(2) Date: Mar. 3, 2020

(87) PCT Pub. No.: WO2019/043668
PCT Pub. Date: Mar. 7, 2019

(65) Prior Publication Data
US 2021/0027281 A1 Jan. 28, 2021

(30) Foreign Application Priority Data

Sep. 4, 2017 (ZA) .................................. 2017/05985
Nov. 16, 2017 (ZA) .................................. 2017/07758

(51) Int. Cl.
*G06Q 20/36* (2012.01)
*A63F 13/792* (2014.01)
(Continued)

(52) U.S. Cl.
CPC ..... *G06Q 20/3672* (2013.01); *G06Q 20/3674* (2013.01); *G06Q 40/04* (2013.01); *A63F 13/792* (2014.09); *H04L 9/0637* (2013.01)

(58) Field of Classification Search
CPC .......................................... G06Q 20/367–3679
(Continued)

(56) References Cited

U.S. PATENT DOCUMENTS 9,710,808 B2 7/2017 Slepinin
2015/0220928 A1 8/2015 Allen
(Continued)

*Primary Examiner* — John W Hayes
*Assistant Examiner* — Cristina Owen Sherr
(74) *Attorney, Agent, or Firm* — Womble Bond Dickinson (US) LLP

(57) ABSTRACT

A computer-implemented method for managing cryptocurrency is disclosed. A plurality of users are provided with an in-marketplace wallet suitable for storing linked digital tokens that are linked in value to cryptocurrency tokens and are required to transact on a digital marketplace platform. A cryptocurrency reserve is provided for storing cryptocurrency tokens. Responsive to a user purchasing linked digital tokens from a marketplace store, linked digital tokens are transferred to the in-marketplace wallet an equivalent value of cryptocurrency tokens are transferred to the cryptocurrency reserve. Responsive to a user withdrawing a number of linked digital tokens from the in-marketplace wallet, the desired number of linked digital tokens are removed from the user's in-marketplace wallet and an equivalent value of cryptocurrency tokens are transferred from the cryptocurrency reserve to an out-of-marketplace wallet of the user for storing cryptocurrency tokens outside of the marketplace platform.

12 Claims, 10 Drawing Sheets

(51) Int. Cl.
*G06Q 40/04* (2012.01)
*H04L 9/06* (2006.01)

(58) Field of Classification Search
USPC .......................................... 705/66
See application file for complete search history.

(56) References Cited

U.S. PATENT DOCUMENTS

| | | | |
|---|---|---|---|
| 2015/0332256 A1* | 11/2015 | Minor | H04L 9/50 705/69 |
| 2015/0363782 A1 | 12/2015 | Ronca et al. | |
| 2016/0358161 A1* | 12/2016 | Cobban | G06Q 20/0655 |
| 2017/0053249 A1 | 2/2017 | Tunnell et al. | |
| 2017/0076262 A1* | 3/2017 | Xing | G06Q 30/0267 |
| 2017/0124557 A1* | 5/2017 | Malliah | G06Q 20/3829 |

* cited by examiner

The price curve of FISH tokens

CRYPTOCURRENCY SYSTEM

CROSS-REFERENCES TO RELATED APPLICATIONS

This application is a national stage filing under 35 U.S.C. § 371 of PCT/IB2018/056739, filed Sep. 4, 2018, which International Application was published by the International Bureau in English on Mar. 7, 2019, as WO 2019/043668, and application claims priority from South African provisional patent application numbers 2017/05985 filed on Sep. 4, 2017, and 2017/07758 filed on Nov. 16, 2017, which are incorporated by reference in their entireties in this application.

FIELD OF THE INVENTION

This invention relates to cryptocurrency systems that are particularly, but not exclusively, suitable for use in online marketplace platforms such as an online gaming platform.

BACKGROUND TO THE INVENTION

Cryptocurrency is a digital asset that serves as a digital medium of exchange, using cryptography to secure transfer of assets and the creation of additional such units of the currency. Numerous forms of cryptocurrencies are known.

Some cryptocurrencies are intended for use in an online marketplace platform however known cryptocurrencies have notable drawbacks and regulatory concerns. Regulatory changes are being made and which have the effect that tokens which share profits, whether directly or through a burning mechanism, are seen as securities by certain Securities and Exchange Commissions. The above cryptocurrency system may not be considered allowable based on these new regulations. More and more statements are expected from different agencies and which may echo the above opinion. There may be a legal and regulatory risk in proceeding with these cryptocurrency systems.

Some of the existing cryptocurrencies are deflationary in nature. The value of tokens held by an individual may be expected to rise, as all transactions will shrink the supply of tokens as a result of the destruction of some tokens with every transaction. This may lead to hoarding of tokens, potentially by speculators, thereby limiting transactions in the marketplace.

The value of the tokens may also be subject to fluctuations as is known with cryptocurrency. As the marketplace may start to generate revenue, the price of the cryptocurrency tokens may be expected to spike. As in-marketplace sales progress, the value of the cryptocurrency may be expected to experience further spikes due to revenue proceeds being used to purchase tokens on the secondary market. As lifetime revenue plateaus, the price may start to decline afterwards as revenue proceeds decline. Additionally, speculation may contribute to wild spikes in value of the cryptocurrency tokens.

Another drawback with present systems is that when prices fluctuate significantly or are uncertain, users are deterred from marketplace participation as consumers tend to make decisions differently to when they would be presented with a determinant price system. Risk averse and rational users may prefer to avoid price uncertainty and avoid in-marketplace spending using highly volatile currency.

The present systems do not align the incentives of backers, users, and other network participants. As fiat currency is suitable to transact in the marketplace, the utility value of the tokens is low. Backers of the cryptocurrency tokens are incentivised to sell the coin when the price is high, which may be when monthly revenue is decreasing. Once backers have sold their tokens, they are no longer incentivised to play or market the marketplace itself, which could decrease the number of users of the marketplace, or players of the game. This may lead to a rapid decrease in the value of the cryptocurrency. There is also little motivation for users to encourage other users to join the marketplace and/or the game—due to the deflationary nature of the current system, users may not want others to join.

There is therefore a need for a cryptocurrency system that alleviates the abovementioned problems and drawbacks, at least to some extent, and which is more suitable to being used as an in-marketplace currency.

The preceding discussion of the background to the invention is intended only to facilitate an understanding of the present invention. It should be appreciated that the discussion is not an acknowledgment or admission that any of the material referred to was part of the common general knowledge in the art as at the priority date of the application.

SUMMARY OF THE INVENTION

In accordance with an aspect of the invention there is provided a computer-implemented method for managing cryptocurrency comprising:
  providing each of a plurality of users with an in-marketplace wallet, the in-marketplace wallet suitable for storing linked digital tokens that are linked in value to cryptocurrency tokens and that are required to transact on a digital marketplace platform;
  providing a cryptocurrency reserve suitable for storing a plurality of cryptocurrency tokens;
  responsive to a user purchasing linked digital tokens from a marketplace store, transferring linked digital tokens to the in-marketplace wallet of the user and transferring an equivalent value of cryptocurrency tokens to the cryptocurrency reserve; and
  responsive to a user withdrawing a number of linked digital tokens from the in-marketplace wallet of the user, removing the desired number of linked digital tokens from the user's in-marketplace wallet and transferring an equivalent value of cryptocurrency tokens from the cryptocurrency reserve to an out-of-marketplace wallet of the user, the out-of-marketplace wallet suitable for storing cryptocurrency tokens outside of the marketplace platform.

Further features provide for the linked digital tokens to be linked by tethering or bonding; for the linked digital tokens to be tethered digital tokens that are linked in value to cryptocurrency tokens; alternatively for the linked digital tokens to be bonded tokens that are generated with a pre-defined price-supply relationship by utilising a smart contract; and for the pre-defined price-supply relationship to be a pre-defined price-supply curve; and for the bonded tokens to comprise a plurality of layered bonded tokens wherein an upper or main layer is provided and lower layers or derived layers of bonded tokens are derived from the main/upper layer and the lower/derived layers of bonded tokens may each be used in a different digital marketplace platform, whereas the upper or main layer may be used across various platforms by deriving the suitable lower layer or lower level token from the upper layer or main layer token using bonding and/or smart contracts; and for the lower layers of bonded tokens each to be arranged to be used in a different part of the digital marketplace platform, while still comprising a part of the same crypto-economic system and benefiting from the network effects and liquidity embedded in and characterizing the shared lower-level or reserve currency upon which the tokens were bonded A further feature provides for the step of transferring cryptocurrency tokens of an equivalent value to the cryptocurrency reserve to include purchasing cryptocurrency tokens from a secondary market at a prevailing secondary market value.

Still further features provide for the method to include the steps of: allowing a user to add cryptocurrency tokens purchased on the secondary market and outside of the marketplace platform to the out-of-marketplace wallet of the user and to sell cryptocurrency tokens held in the out-of-marketplace wallet of the user on the secondary market; and, responsive to a user transferring a value of a specific number of cryptocurrency tokens from the out-of-marketplace wallet of the user to the in-marketplace wallet of the user, removing the specific number of cryptocurrency tokens from the out-of-marketplace wallet, transferring the cryptocurrency tokens to the cryptocurrency reserve, and transferring an equivalent value of linked or tethered digital tokens to the user's in-marketplace wallet.

Yet further features provide for the digital marketplace platform to be a digital gaming platform; for the marketplace store to be a gaming store; for the in-marketplace wallet to be an in-game wallet; and for the out-of-marketplace wallet to be an out-of-game wallet; alternatively for the method to be implemented in an online marketplace or forum platform or environment and for the in-marketplace wallet to be associated with the online forum platform.

Further features provide for the method to include the step of purchasing a package from the marketplace store; for purchasing linked or tethered digital tokens from the marketplace store to form part of the step of purchasing a package from the marketplace store; and for a package to include at least one or more of linked or tethered digital tokens, creatures usable to play the game with, and consumables usable within the game.

A still further features provides for the cryptocurrency tokens to be blockchain-based tokens, and for the linked or tethered digital tokens to be non-blockchain-based tokens.

Yet further features provide for the method to include the step of, responsive to a user completing a task, challenge or the like in the marketplace platform, rewarding the user with a predetermined number of linked or tethered digital tokens; and for the cryptocurrency in the cryptocurrency reserve to be increased responsive to the user being rewarded with linked or tethered digital tokens by transferring an equivalent value of cryptocurrency tokens to the cryptocurrency reserve.

Further features provide for the method to include the steps of: providing a trading hub or trading platform or trading forum; allowing a user to exchange digital assets or digital goods such as creatures or consumables for linked or tethered digital tokens or for other digital goods or assets, creatures or consumables on the trading hub; allowing a user to offer a digital asset, creature or consumable on the platform; allowing users to bid on an offered digital asset, creature or consumable; and, responsive to a first trader trading a digital asset, creature or consumable for linked or tethered digital tokens or other digital assets, creatures or consumables of a second trader, transferring the digital asset, creature or consumable and the linked or tethered digital tokens between the in-marketplace wallets of the first and second traders as appropriate.

Still further features provide for the method to include the step of, responsive to a user requesting to store a digital asset or creature, transferring the digital asset or creature from the user's in-marketplace wallet to the user's out-of-marketplace wallet; and the step of, responsive to a user requesting to return a stored digital asset or creature, transferring the stored digital asset or creature from the user's out-of-marketplace wallet to the in-marketplace wallet of the user.

A yet further feature provides for the method to include the step of, responsive to a value of linked or tethered digital tokens in a user's in-marketplace wallet being below a predetermined level, preventing a user from accessing a part of the marketplace associated with the predetermined level; and, responsive to a value of linked or tethered digital tokens in a user's in-marketplace wallet being equal to or above the predetermined level, allowing a user to access the part associated with the predetermined level.

Further features provide for the method to include the steps of: providing a non-transferrable in-marketplace currency storable in the in-marketplace wallet; and, responsive to a user completing a task, challenge or the like in the marketplace platform, rewarding the user with a predetermined amount of the non-transferrable in-marketplace currency.

In accordance with a further aspect of the invention there is provided a system for managing cryptocurrency, the system including a memory for storing computer-readable program code and a processor for executing the computer-readable program code, the system comprising:

an in-marketplace wallet component for providing each of a plurality of users with an in-marketplace wallet, the in-marketplace wallet suitable for storing linked digital tokens that are linked in value to cryptocurrency tokens and that are required to transact on a digital marketplace platform;

a cryptocurrency reserve component for providing a cryptocurrency reserve suitable for storing a plurality of cryptocurrency tokens;

a linked digital token transferring component for, responsive to a user purchasing linked digital tokens from a marketplace store, transferring linked digital tokens to the in-marketplace wallet of the user and for, responsive to a user withdrawing a number of linked digital tokens from the in-marketplace wallet of the user, removing the desired number of linked digital tokens from the user's in-marketplace wallet; and a cryptocurrency token transferring component for, responsive to the linked digital token transferring component transferring linked digital tokens to the user's in-marketplace wallet, transferring an equivalent value of cryptocurrency tokens to the cryptocurrency reserve and for, responsive to the linked digital token transferring component removing the linked digital tokens from the user's in-marketplace wallet, transferring an equivalent value of cryptocurrency tokens from the cryptocurrency reserve to an out-of-marketplace wallet of the user, the out-of-marketplace wallet suitable for storing cryptocurrency tokens outside of the marketplace platform.

Further features provide for the linked digital tokens to be linked by tethering or bonding; for the linked digital tokens to be tethered digital tokens that are linked in value to cryptocurrency tokens; alternatively for the linked digital tokens to be bonded tokens that are generated with a pre-defined price-supply relationship by utilising a smart contract; and for the pre-defined price-supply relationship to be a pre-defined price-supply curve.

A further feature provides for the marketplace store to be provided by a marketplace component.

A still further feature provides for the system to include an out-of-marketplace wallet component for providing at least some of the users with an out-of-marketplace wallet, the out-of-marketplace wallet suitable for storing cryptocurrency tokens outside of the marketplace platform.

Yet further features provide for the system to include a cryptocurrency purchasing component for purchasing cryptocurrency tokens from a secondary market at a prevailing secondary market value to allow the cryptocurrency token transferring component to transfer cryptocurrency tokens to the cryptocurrency reserve.

Further features provide for the system to include a secondary market cryptocurrency component for allowing a user to add cryptocurrency tokens purchased on the secondary market and outside of the marketplace platform to the out-of-marketplace wallet of the user and to sell cryptocurrency tokens held in the out-of-marketplace wallet of the user on the secondary market; and, an out-of-marketplace to in-marketplace transferring component for, responsive to a user transferring a value of a specific number of cryptocurrency tokens from the out-of-marketplace wallet of the user to the in-marketplace wallet of the user, removing the specific number of cryptocurrency tokens from the out-of-marketplace wallet of the user, transferring the cryptocurrency tokens to the cryptocurrency reserve, and transferring an equivalent value of linked or tethered digital tokens to the user's in-marketplace wallet.

Still further features provide for the digital marketplace platform to be a digital gaming platform; for the marketplace store to be a gaming store; for the in-marketplace wallet to be an in-game wallet; and for the out-of-marketplace wallet to be an out-of-game wallet.

A yet further feature provides for the system to include a package purchasing component for allowing purchasing of a package from the marketplace store.

A further feature provides for the system to include a reward component for, responsive to a user completing a task, challenge or the like in the marketplace platform, rewarding the user with a predetermined number of linked or tethered digital tokens; and for the cryptocurrency transferring component to be further configured to, responsive to the user being rewarded with linked or tethered digital tokens, transfer cryptocurrency tokens of an equivalent value to the cryptocurrency reserve.

Still further features provide for the system to include a trading platform component or a trading forum component or a trading hub component for providing a trading hub, the trading hub allowing a user to exchange digital assets, creatures or consumables for linked or tethered digital tokens or for other digital assets, creatures or consumables, allowing a user to offer a digital asset, creature or consumable on the platform, allowing users to bid on an offered digital asset, creature or consumable, and, responsive to a first trader trading a digital asset, creature or consumable for linked or tethered digital tokens or other digital assets, creatures or consumables of a second trader, transferring the digital asset, creature or consumable and the linked or tethered digital tokens between the in-marketplace wallets of the first and second traders as appropriate.

Yet further features provide for the system to include a digital asset transferring component or a creature transferring component for, responsive to a user requesting to store a digital asset or creature, transferring the digital asset or creature from the user's in-marketplace wallet to the user's out-of-marketplace wallet; and for, responsive to a user requesting to return a stored digital asset or creature, transferring the stored digital asset or creature from the user's out-of-marketplace wallet to the user's in-marketplace wallet.

A further feature provides for system to include a marketplace access component for, responsive to a value of linked or tethered digital tokens in a user's in-marketplace wallet being below a predetermined level, preventing a user from accessing a part of the marketplace associated with the predetermined level; and for, responsive to a value of linked or tethered digital tokens in a user's in-marketplace wallet being equal to or above the predetermined level, allowing a user to access the part associated with the predetermined level.

Still further features provide for the system to include a non-transferrable currency component for providing a non-transferrable in-marketplace currency storable in the in-marketplace wallet; and a non-transferrable currency reward component for, responsive to a user completing a task, challenge or the like in the marketplace platform, rewarding the user with a predetermined amount of the non-transferrable in-marketplace currency.

In accordance with a further aspect of the invention there is provided a computer program product for managing cryptocurrency, the computer program product comprising a computer-readable medium having stored computer-readable program code for performing the steps of:

providing each of a plurality of users with an in-marketplace wallet, the in-marketplace wallet suitable for storing linked digital tokens that are linked in value to cryptocurrency tokens and that are required to transact on a digital marketplace platform;

providing a cryptocurrency reserve suitable for storing a plurality of cryptocurrency tokens;

responsive to a user purchasing linked digital tokens from a marketplace store, transferring linked digital tokens to the in-marketplace wallet of the user and transferring an equivalent value of cryptocurrency tokens to the cryptocurrency reserve; and responsive to a user withdrawing a number of linked digital tokens from the in-marketplace wallet of the user, removing the desired number of linked digital tokens from the user's in-marketplace wallet and transferring an equivalent value of cryptocurrency tokens from the cryptocurrency reserve to an out-of-marketplace wallet of the user, the out-of-marketplace wallet suitable for storing cryptocurrency tokens outside of the marketplace platform.

Further features provide for the computer-readable medium to be a non-transitory computer-readable medium and for the computer-readable program code to be executable by a processing circuit.

In accordance with an aspect of the invention there is provided a computer-implemented method for managing cryptocurrency comprising:

providing each of a plurality of users with an in-marketplace wallet, the in-marketplace wallet suitable for storing cryptocurrency tokens required to transact with a marketplace store of a digital marketplace platform;

providing at least some of the users with an out-of-marketplace wallet, the out-of-marketplace wallet suitable for storing cryptocurrency tokens outside of the marketplace platform;

responsive to a user transferring cryptocurrency tokens from the out-of-marketplace wallet of the user to the in-marketplace wallet of the user, allowing the transfer without transaction fees; and responsive to a user transferring cryptocurrency tokens from the in-marketplace wallet of the user to the out-of-marketplace wallet of the user, charging the user a withdrawal fee.

Further features provide for the method to include the steps of: providing a cryptocurrency reserve suitable for storing a plurality of cryptocurrency tokens; responsive to a user purchasing cryptocurrency tokens for the in-marketplace wallet using fiat currency, transferring the purchased tokens from the cryptocurrency reserve to the user's in-marketplace wallet; increasing the number of cryptocurrency tokens in the cryptocurrency reserve by transferring cryptocurrency tokens received as payment by the marketplace store thereto; and purchasing cryptocurrency tokens from a secondary market at a prevailing secondary market value.

Still further features provide for the method to include the steps of: allowing a user to purchase items from the marketplace store outside of the marketplace platform using fiat currency; and allowing a user to add cryptocurrency tokens purchased on the secondary market and outside of the marketplace platform to the out-of-marketplace wallet and to sell cryptocurrency tokens held in the out-of-marketplace wallet on the secondary market.

Yet further feature provides for the method to include the steps of: providing a non-transferrable in-marketplace currency storable in the in-marketplace wallet and purchasable in exchange for cryptocurrency tokens, the non-transferrable in-marketplace currency being usable to transact with in the marketplace platform; and, responsive to a user completing a task, challenge or the like in the marketplace platform, rewarding the user with a predetermined value of the non-transferrable in-marketplace currency.

Further features provide for the digital marketplace platform to be a digital gaming platform; for the marketplace store to be a gaming store; for the in-marketplace wallet to be an in-game wallet; for the out-of-marketplace wallet to be an out-of-game wallet; and for the non-transferrable in-marketplace currency to be non-transferable in-game currency.

In accordance with a further aspect of the invention there is provided a system for managing cryptocurrency, the system including a memory for storing computer-readable program code and a processor for executing the computer-readable program code, the system comprising:

an in-marketplace wallet component for providing each of a plurality of users with an in-marketplace wallet, the in-marketplace wallet suitable for storing cryptocurrency tokens required to transact with a marketplace store of a digital marketplace platform;

an out-of-marketplace wallet component for providing at least some of the users with an out-of-marketplace wallet, the out-of-marketplace wallet suitable for storing cryptocurrency tokens outside of the marketplace platform;

a wallet free transferring component for, responsive to a user transferring cryptocurrency tokens from the out-of-marketplace wallet of the user to the in-marketplace wallet of the user, allowing the transfer without transaction fees; and a wallet withdrawal fee component for, responsive to a user transferring cryptocurrency tokens from the in-marketplace wallet of the user to the out-of-marketplace wallet of the user, charging the user a withdrawal fee.

Further features provide for the system to include a reserve component for providing a cryptocurrency reserve suitable to store a plurality of cryptocurrency tokens; a token transferring component for, responsive to a user purchasing cryptocurrency tokens for the in-marketplace wallet using fiat currency, transferring the purchased tokens from the cryptocurrency reserve to the user's in-marketplace wallet; a cryptocurrency token increasing and transmitting component for increasing the number of cryptocurrency tokens in the cryptocurrency reserve by transferring cryptocurrency tokens received as payment by the marketplace store thereto; and a cryptocurrency purchasing component for purchasing cryptocurrency tokens from a secondary market at a prevailing secondary market value.

Still further features provide for the system to include an out-of-marketplace purchase component for allowing a user to purchase items from the marketplace store outside of the marketplace using fiat currency; and for the out-of-marketplace wallet component to be adapted to allow a user to add cryptocurrency tokens purchased on the secondary market and outside of the marketplace to the out-of-marketplace wallet of the user and to sell cryptocurrency tokens held in the out-of-marketplace wallet on the secondary market.

Yet further features provide for the system to include a non-transferrable currency component for providing a non-transferrable in-marketplace currency storable in the user's in-marketplace wallet and purchasable in exchange for cryptocurrency tokens, the non-transferrable in-marketplace currency being usable to transact with in the marketplace platform; and a non-transferable currency reward component for, responsive to a user completing a task, challenge or the like in the marketplace, rewarding the user with a predetermined value of the non-transferrable in-marketplace currency.

In accordance with a further aspect of the invention there is provided a computer program product for managing cryptocurrency, the computer program product comprising a computer-readable medium having stored computer-readable program code for performing the steps of:

providing each of a plurality of users with an in-marketplace wallet, the in-marketplace wallet suitable for storing cryptocurrency tokens required to transact with a marketplace store of a digital marketplace platform;

providing at least some of the users with an out-of-marketplace wallet, the out-of-marketplace wallet suitable for storing cryptocurrency tokens outside of the marketplace platform;

responsive to a user transferring cryptocurrency tokens from the out-of-marketplace wallet of the user to their in-marketplace wallet of the user, allowing the transfer without transaction fees; and responsive to a user transferring cryptocurrency tokens from the in-marketplace wallet of the user to the out-of-marketplace wallet of the user, charging the user a withdrawal fee.

Further features provide for the computer-readable medium to be a non-transitory computer-readable medium and for the computer-readable program code to be executable by a processing circuit.

Embodiments of the invention will now be described, by way of example only, with reference to the accompanying drawings.

DETAILED DESCRIPTION WITH REFERENCE TO THE DRAWINGS

Figure 4:
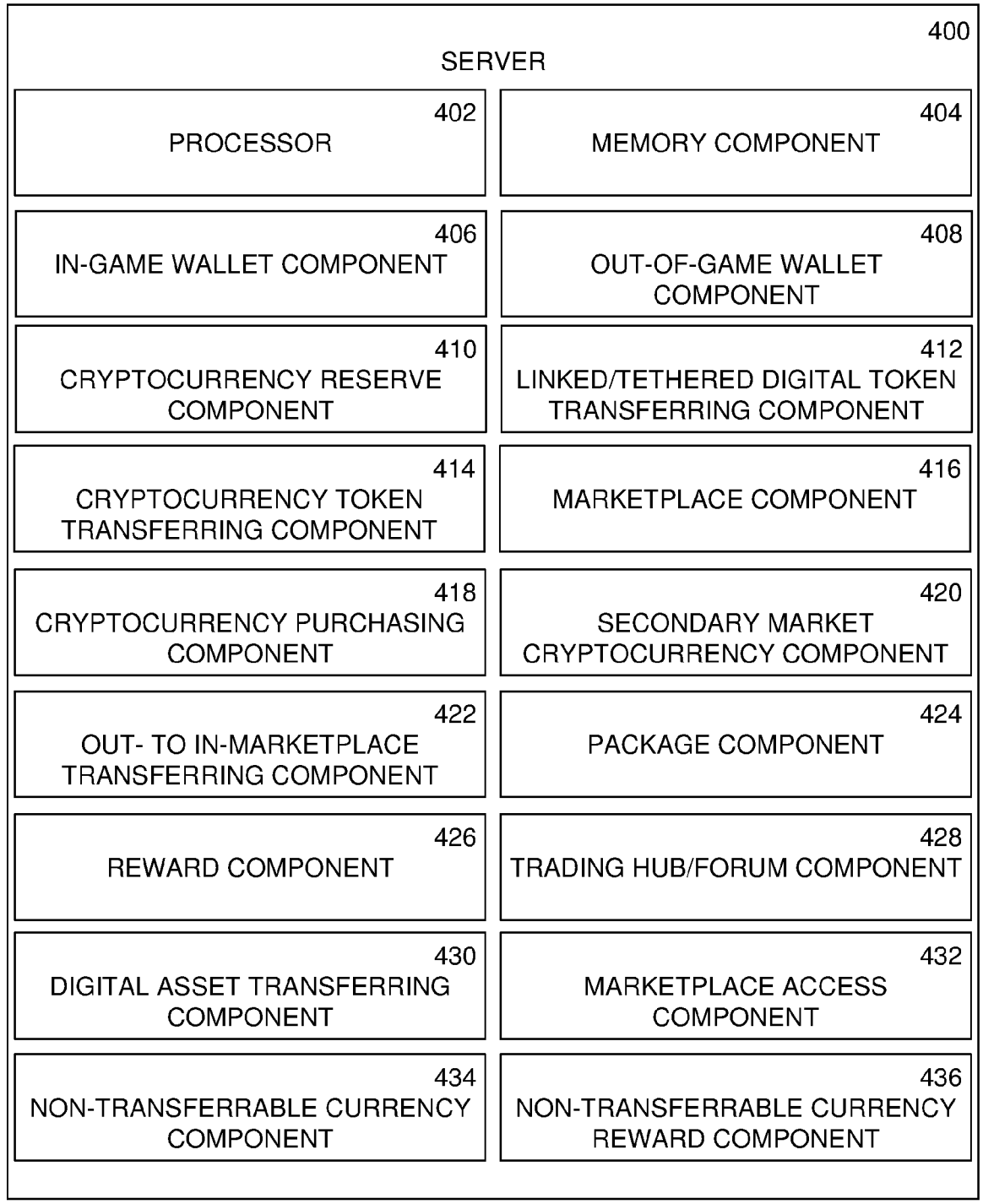
FIG. 4 is a block diagram of a system for managing cryptocurrency according to the method of FIG. 3.
Figure 5:
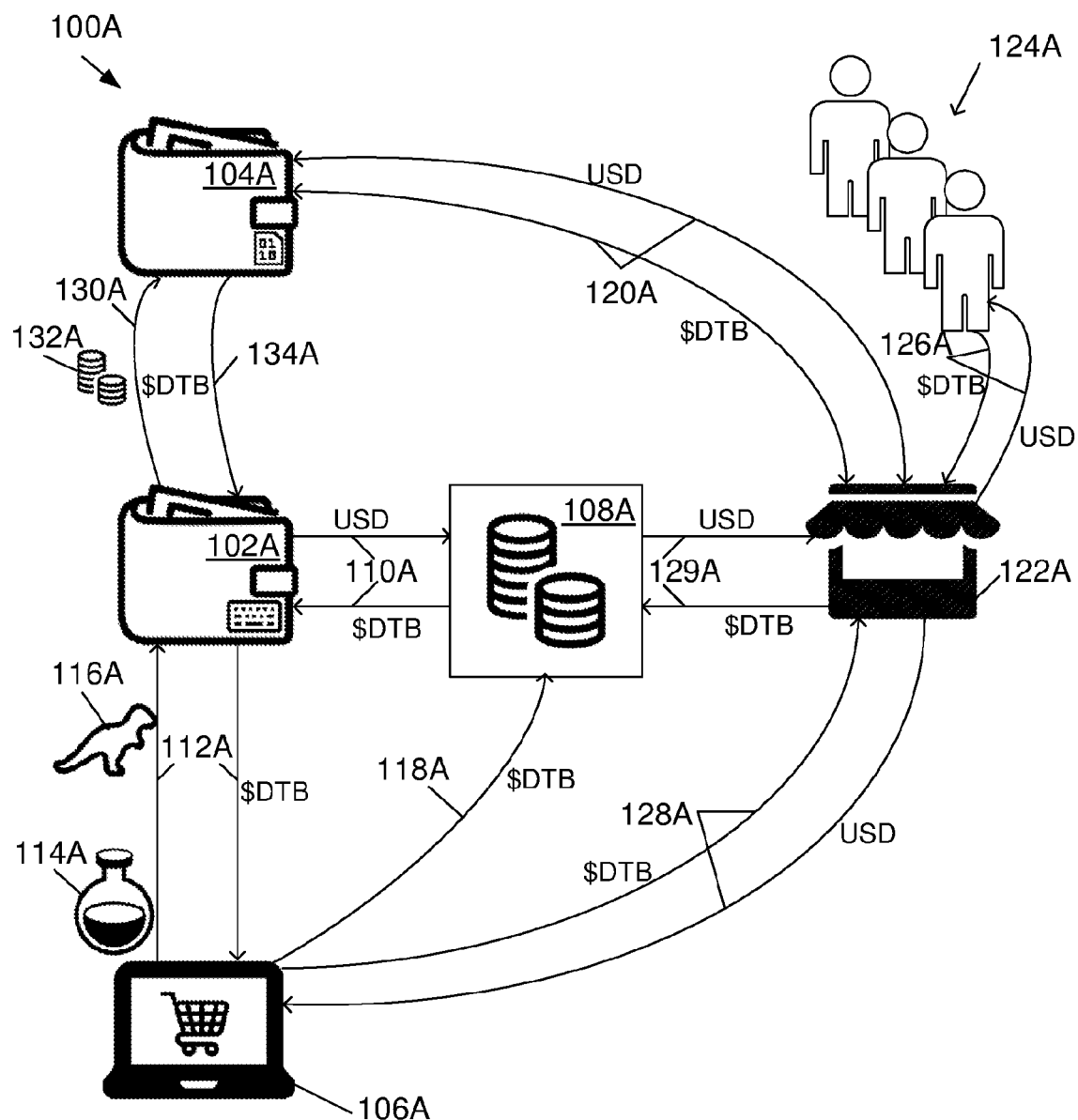
FIG. 5 is a schematic diagram of a system for managing cryptocurrency according to an exemplary embodiment of the invention.
Figure 8:
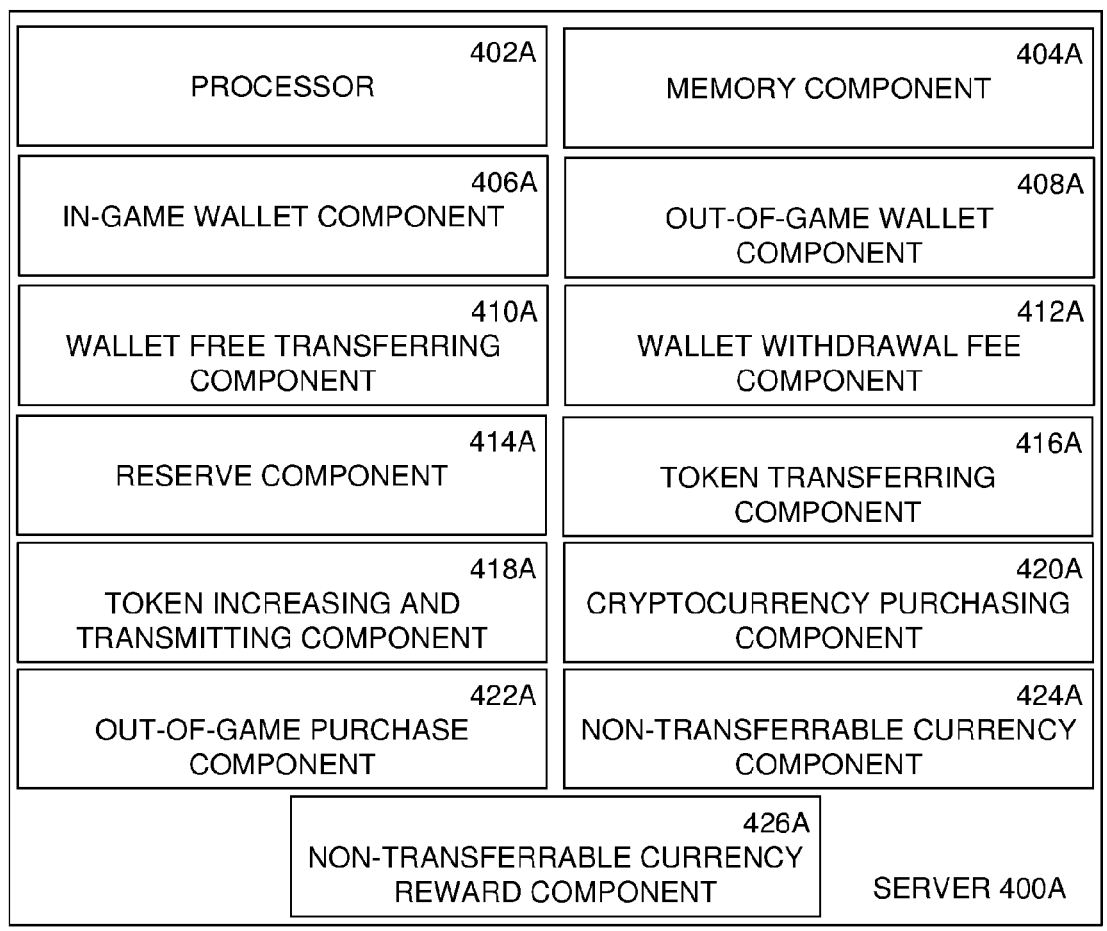
FIG. 8 is a block diagram of a system for managing cryptocurrency according to the method of FIG. 7.
Figure 9:
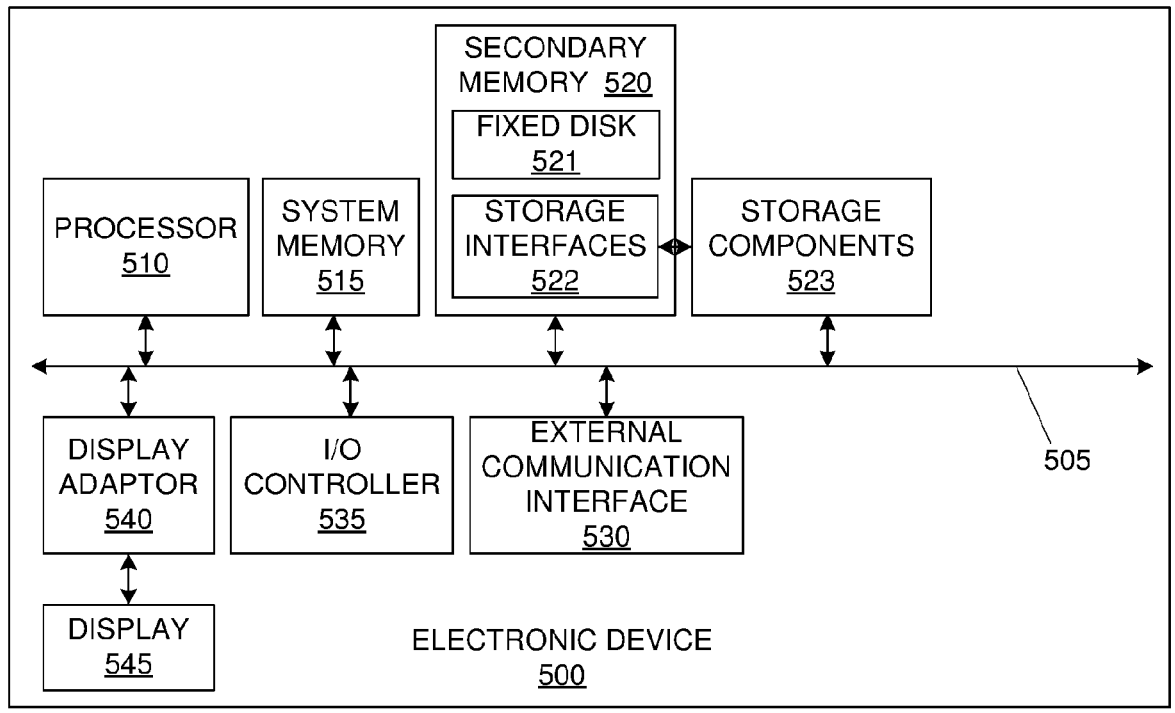
FIG. 9 illustrates an example of an electronic device in which various aspects of the disclosure may be implemented

A first embodiment of the invention is disclosed herein with reference to FIGS. 1 to 4 and a second embodiment of the invention is disclosed with reference to FIGS. 5, to 8. FIG. 9 illustrates an example of an electronic device in which various aspects of the embodiments of the disclosure may be implemented. Further embodiments of the invention are shown in FIGS. 10 to 14.

The systems and methods described herein provide a cryptocurrency operating and managing system which is particularly, but not exclusively, suitable for use in an online marketplace platform such as an online digital gaming platform. In the first embodiment, users are provided with an in-marketplace wallet and an out-of-marketplace wallet, which may be used to manage their cryptocurrency tokens. The system and method of the first embodiment incorporates cryptocurrency tokens as well as tethered digital tokens that are linked in value to the cryptocurrency tokens. An out-of-marketplace wallet may be used to store cryptocurrency tokens, while the in-marketplace wallet may be used for storing the tethered digital tokens.

In the first embodiment a cryptocurrency reserve is provided and which may be configured to store the same value of cryptocurrency tokens as there are tethered digital tokens in the wallets of users participating in the marketplace. The reserve may be held in a specifically-designed cryptocurrency wallet by an operator of the system. To transact in the marketplace, a user will require tethered digital tokens, which they may obtain by trading fiat currency, such as US dollars, for the tethered digital tokens at a marketplace store. The marketplace store may purchase an equivalent value of cryptocurrency tokens from the secondary market, and may then deposit the purchased cryptocurrency tokens into the cryptocurrency reserve. A user may also purchase other elements required to participate in the marketplace from the marketplace store. In a gaming marketplace, this may be digital goods or digital assets such as characters and/or consumables. Consumables may include in-game consumable items, once off spells, potions etc. A package may be purchased which may contain a selection of tethered digital tokens, digital goods or digital assets, characters, and/or consumables.

A user may then use their tethered digital tokens and characters or consumables to participate in the marketplace. The user may use their characters to perform tasks or challenges, for example battle other characters or complete quests in the game. In return for successful completion of such task or challenge, the user may be rewarded with more tethered digital tokens or with non-transferrable digital currency, such as coins (which are not tokenized and/or not tradeable outside the game). The non-transferrable currency may allow a user to play the game free of charge and without purchasing additional tethered digital tokens. The reserve may buy additional cryptocurrency tokens from the secondary market to keep the cryptocurrency reserve's value of cryptocurrency tokens the same as the value of tethered digital tokens in the in-marketplace wallets of users. Users may use their tethered digital tokens to auction or buy characters or consumables from other users, or may trade digital goods or assets, characters and/or consumables.

When a user wishes to withdraw the value of some of their tethered digital tokens, they may trade it for cryptocurrency tokens from the cryptocurrency reserve. It is envisaged that an online, Internet-based portal may facilitate such trading. The tethered digital tokens may then be destroyed, while cryptocurrency tokens to the value of the destroyed tethered digital tokens will be transmitted to the user's out-of-marketplace wallet. The user may be allowed to sell the cryptocurrency tokens in their out-of-marketplace wallet on the secondary or second-hand market, or may buy additional cryptocurrency tokens on the secondary market. The user may be allowed to trade cryptocurrency tokens held in their out-of-marketplace wallet for tethered digital tokens in their in-marketplace wallet. The cryptocurrency tokens may be added to the cryptocurrency reserve.

To enable use of the present invention, cryptocurrency tokens may be created. The cryptocurrency tokens should be transferrable and tokenized. A blockchain may be used to track the cryptocurrency tokens. These cryptocurrency tokens may be intended for use in an online marketplace in the form of an online digital gaming platform. The game associated with the cryptocurrency may also employ the blockchain to keep track of and secure gaming data. For illustrative purposes, the operator of a proposed cryptocurrency system may call their cryptocurrency tokens "Databits", and may use the abbreviation "$DTB" to refer to such cryptocurrency tokens. In the remainder of the specification, "$DTB" should be construed to refer to one example of cryptocurrency tokens.

In the second embodiment, users are also provided with an in-marketplace wallet and an out-of-marketplace wallet, which may be used to manage their cryptocurrency tokens. However, in the second embodiment the in-marketplace wallet may be used to transact on a store of a marketplace platform, for example for purchasing digital goods or assets, items or characters usable to play a game associated with the platform. If a user transfers tokens to their out-of-marketplace wallet, they are charged a transaction fee. Using the system of the second embodiment, a user may transfer tokens from their out-of-marketplace wallet to their in-marketplace wallet without incurring any such transaction fee. Tokens may be bought on a secondary market and added to a user's out-of-marketplace wallet.

A cryptocurrency reserve is also provided in the second embodiment and from which a user can buy cryptocurrency tokens, which are then deposited into the user's in-marketplace wallet. Tokens may be added to the reserve as a result of sales from the marketplace platform store. To regulate the price of tokens in the marketplace, tokens may be purchased by the reserve at a prevailing secondary market rate to maintain a level of tokens held thereby. Tokens may be traded on the secondary market, and a user may buy tokens on the secondary market to add to their out-of-marketplace wallet. From there, the tokens may be freely moved to their in-marketplace wallet.

It will be apparent to a person skilled in the relevant art that the present invention is suitable for use with any online-based marketplace that lends itself to functioning with an electronic currency, for example online-based games or forums. Many users may make use of such a marketplace, and in the present embodiment the cryptocurrency system may be configured so that purchases on the marketplace platform may only be possible using the tethered digital tokens or cryptocurrency tokens of the cryptocurrency systems according to the embodiments of cryptocurrency systems disclosed herein.

The marketplace may be accessible from any electronic device suitably in data communication with other users and the system components required for its operation. Data communication may be expected to occur over the Internet. Electronic devices on which the marketplace may be accessed includes, but is not limited to, desktop computers, laptop computers, tablets, phablets, mobile phones, video game consoles, and the like.

Figure 1:
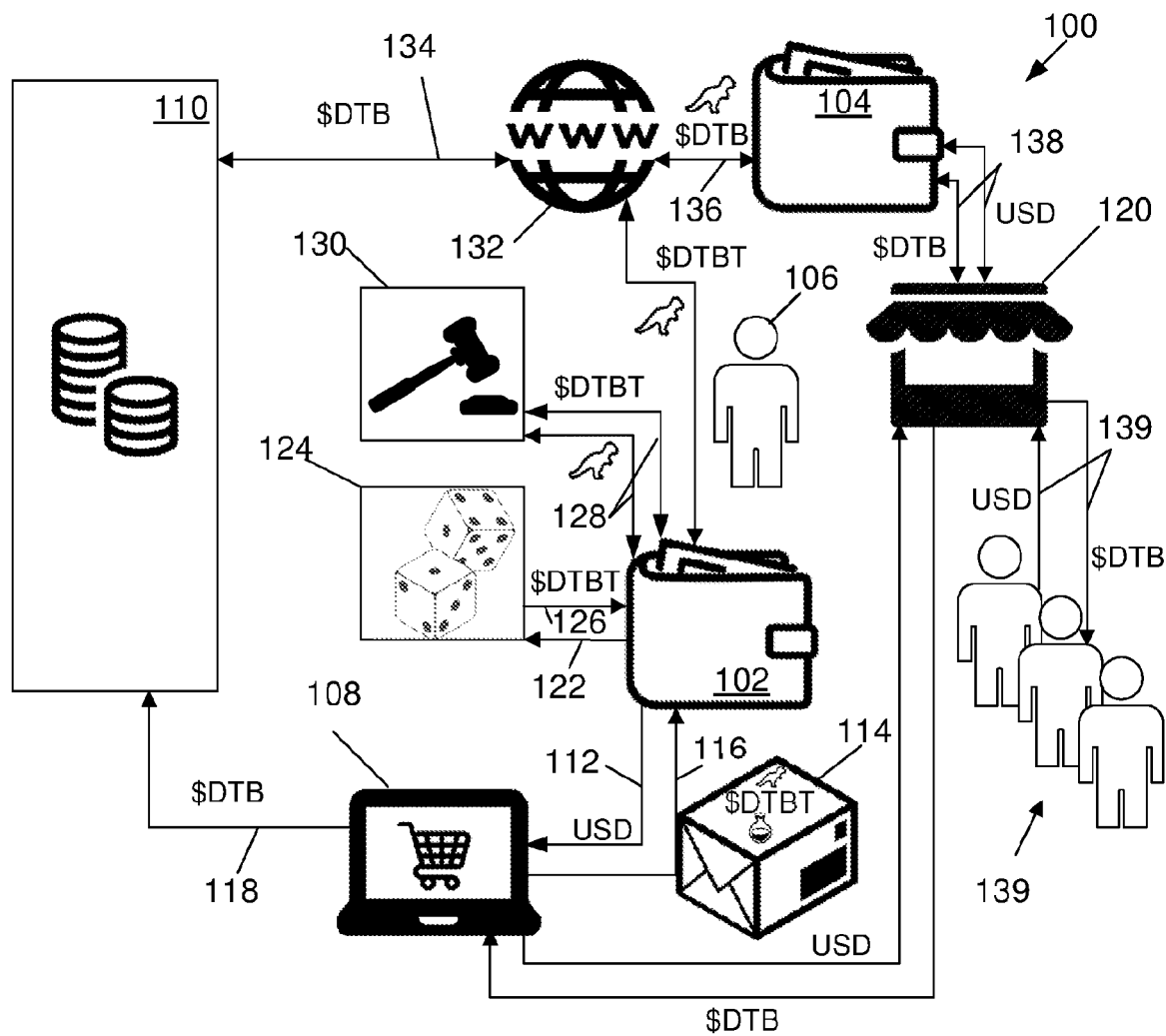
FIG. 1 is a schematic diagram of a system for managing cryptocurrency according to an exemplary embodiment of the invention.

FIG. 1 is a schematic diagram which illustrates an exemplary system (100) for managing cryptocurrency in an online marketplace platform, an online digital gaming platform in the present embodiment. The system includes an in-marketplace wallet, presently an in-game wallet (102), and an out-of-marketplace wallet, presently an out-of-game wallet (104), provided to a user (106). An online marketplace store, presently an online gaming platform store (108), forms part of the system (100). A cryptocurrency token reserve (110) is also provided.

The out-of-game wallet (104) may be a newly created wallet specifically configured and adapted to store $DTB only, in which case it may be provided by the operator of the cryptocurrency system as it is in the present embodiment. It may, however, be a pre-existing wallet of the user which may be configured to store different types of cryptocurrency at the same time. To this end, "providing" a user with an out-of-game wallet may include "associating" an existing out-of-game wallet of the user with their in-game wallet. The out-of-game wallet (104) may be on-chain, meaning that it may operate using blockchain technology, allowing users to store digital assets and cryptocurrency ($DTB) outside of the game.

It is envisaged that each user of the online gaming platform will be provided with an in-game wallet (102) in order to transact on the marketplace, in the present embodiment being to partake in the game supported by the gaming platform. The in-game wallet (102) may be configured to store tethered digital tokens which are linked in value to $DTB, but which are not block-chain based. In the remainder of the specification, the term "$DTBT" (which may refer to "Databits Tether") should be construed to refer to such tethered digital tokens.

$DTBT is required to partake in the game supported by the gaming platform. To obtain $DTBT, a user may purchase (112) a package (114) from the store (108), typically as a form of an in-application purchase via an application facilitating playing of the game. The package (114) may contain $DTBT, as well as creatures and/or characters that may be used to play the game with. The contents of the package (114) are delivered (116) to and stored in the in-game wallet (102) of the user along with other digital assets, pre-existing creatures, characters and/or $DTBT.

It is envisaged that a user will purchase (112) the package (114) using fiat currency, in the present embodiment US Dollars. An operator facilitating hosting of the gaming platform may require that a percentage of such a sale, for example 30%, be paid to them. Of the remaining 70% of the original amount, a certain percentage may be allocated to creatures, and a certain percentage to consumables. The remainder of the original value of the purchase may be used to provide the user with $DTBT. If, for example, the value of the original purchase is 100 US dollars, 30 US dollars may go to the operator of the platform such as Apple™ or Google™, 20 US dollars may be allocated towards creatures, and 10 US dollars towards consumables. The remaining 40 US dollars may then be used to provide the user with $DTBT.

As $DTBT is tethered digital tokens linked in value to $DTB, the user is provided with 40 US dollars' worth of $DTBT. If, for example, 1 $DTB is worth 1,000 $DTBT, the user would receive 1,000 $DTBT for every 1 $DTB that their remaining money may purchase. In this example, if the value of 1 $DTB is 10 US dollars, 40 US dollars will equal 4 $DTB's worth. The user will then receive 4,000 $DTBT as part of their package (112).

At the same time, the cryptocurrency reserve purchases 4 $DTB from a secondary market (120), and deposits (118) the $DTB into the cryptocurrency reserve (110). The value of tethered digital tokens in the in-game wallet then equals the value of cryptocurrency tokens in the cryptocurrency reserve.

It is envisaged that $DTBT will be the only "currency" usable within the game itself. When a user plays (122) the game (124) using their characters and consumables as required, they may be rewarded (126) with additional $DTBT if they successfully complete tasks, challenges, battles or the like. It is envisaged that "playing the game" may involve battling other users via the users' respective characters. Again, the marketplace (108) will purchases an equivalent value of $DTB from the secondary market (120). The idea is that the value of $DTBT in the game, and therefore in the in-game wallets of users, remain the same as the value of $DTB in the cryptocurrency reserve (110).

Users may be limited as to which parts and/or features and/or levels of the game they are able to access as a result of the balance of $DTBT held in their in-game wallets. A user may be required to have a specific number of $DTBTs in their in-game wallets to be allowed access to a specific level. A user may obtain $DTBTs by purchasing them as described above, or by completing tasks or challenges, as also explained above.

Users may also trade (128), i.e. send and receive or exchange, digital assets or virtual goods such as characters or consumables (that may be consumed/used in-game) for either $DTBT or other characters or consumables at a trading hub (130) or trading platform or trading forum. It will be apparent that the characters, consumables and/or $DTBT will then be moved from the wallet of a sending user to that of a receiving user. It is envisaged that bidding functionality may be provided by the trading hub, and online auctions may be allowed whereby several user may bid on characters or consumables that other users places on the hub for auction. A user may also offer a character or consumable for sale on the trading hub (130) allowing others to purchase it. The trading hub may be a peer-to-peer trading hub. Creatures and/or consumables, as well as tethered digital tokens, are transferred between the in-game wallets of users as appropriate upon conclusion of a transaction on the trading hub (130).

If a user wishes to remove some of their $DTBT from their in-game wallet (102), they may withdraw $DTBT from their in—game wallet (102) via a suitable internet-based portal (132) in exchange for $DTB to be deposited in their out-of-game wallet. When a user removes $DTBT from their in-game wallet and via the internet-based portal (132), an equivalent value of $DTB is transferred (134) from the cryptocurrency reserve, and from there transferred (136) to the user's out-of-game wallet (104). The $DTBT removed from the user's in-game wallet may then be destroyed. This will further ensure that the value of $DTBT in the wallets of participating users equals the value of $DTB in the cryptocurrency reserve (110). For security reasons, the internet-based portal (132) may be provided with an anti-money laundering (AML) element or a know your customer (KYC) element or a similar security system.

The user may trade (138) their $DTB on the secondary market (120) as may be expected of cryptocurrency. They may sell their $DTB in exchange for fiat currency, for example US dollars, or may buy $DTB using fiat currency. However, it should be noted that any acceptable form of fiat currency may be used for such trading transactions, including other forms of cryptocurrency. $DTB bought on the secondary market will be added to a user's out-of-game wallet, and $DTB sold will be removed therefrom.

At least in the beginning of operation of the system (100), the secondary market may be provided by original backers and/or speculators (139) that are already in possession of $DTB. Their $DTB may have been acquired during an initial coin offering phase, and they may now wish to sell (139) their $DTB. The backers (139) may sell their $DTB in exchange for any fiat currency, such as US dollars of the present example, or may accept any other form of cryptocurrency as is known in the art.

A user may be able to store other game-related concepts, particularly characters, in their out-of-game wallet. A user may, via the internet-based portal (132), request to store a creature in their out-of-game wallet. The creature may then be transferred to their out-of-game wallet (104), and the user (106) may then be allowed to transfer them back to their in-game wallet (102) when so desired and requested.

A user may also be allowed to transfer a value of $DTBT to their in-game wallet (102) from their out-of-game wallet (104). A user may, also via the internet-based portal (132), transfer (136) $DTB from their out-of-game wallet, from where it will be transferred (134) to the cryptocurrency reserve (110). The user will then be provided with an equal value of $DTBT transferred to their in-game wallet, and may continue to use the $DTBT for playing the game. This will also ensure that the value of $DTBT in the wallets of participating users equals the value of $DTB in the cryptocurrency reserve (110).

A user may be rewarded for completing tasks, challenges or the like in the game with some form of non-transferrable in-marketplace currency, for example consumable digital coins. Such coins may not be sold by the marketplace store, and is not envisaged to be a tokenized coin. It will not be transferrable outside of the game itself, and cannot be converted into $DTBT or $DTB. Such coins may allow users to play the game free of charge, as the coins may be usable instead of $DTBT for certain transactions in the game.

Users may be required to have a certain amount of $DTBT in their in-game wallets to gain access to a specific part of the game, such as a level, region or challenge. If the amount of $DTBT in a user's in-game wallet is lower than a predetermined amount, they may not be allowed access to that part. If it is equal to or above the predetermined amount, they may be allowed to access that part. Different parts may be restricted according to different amounts of $DTBT.

The applicant believes that its proposed cryptocurrency system allows $DTB to be related to the in-game economy, giving the tokens a clear utility. A proposed "best practise" for a utility token is based on so-called "equation of exchange". This could be described in the following manner: A crypto-asset valuation is largely comprised of solving for M, where M=PQ/V. M is the size of the monetary base necessary to support a crypto-economy of size PQ, at velocity V. Thus, in order for $DTB to be a utility token is should be directly linked to a crypto-economy, in turn the crypto-economy should be related to the game economy.

Requiring that users have a certain value of $DTBT in their in-game wallet may lower the velocity of tokens in the above equation. A lower velocity of $DTBT may lead to a greater overall monetary supply or base, and in turn, the price of $DTB, according to M=PQ/V.

Ideally, the value of a cryptocurrency token should be a function of the network size, roughly following Metcalf's law (which states that the value of a telecommunications network is proportional to the square of the number of connected users of the system). The present system may enable this. The value of the cryptocurrency tokens, $DTB, and the value of the network may be more aligned. The more players that join the game, the more demand for $DTB will be as $DTBT will effectively be exchanged for $DTB by the marketplace store.

Mathematically, "PQ" is the crypto-economy GDP or Gross Domestic Product. As PQ increases in the equation MV=PQ and as more packages are purchased, so should M, which is the total value of coins (i.e. cryptocurrency tokens) assuming velocity can remain constant.

The utility of the cryptocurrency tokens enable network participation for the holder of the token, i.e. if a player wants to buy a creature, they need to "own" an equivalent of $DTB in the form of $DTBT. Their equivalent will just be held in the cryptocurrency reserve. This provides definite utility to $DTB. The only way in which creature and some consumables will be purchasable is if $DTB will be purchased and held by the cryptocurrency reserve.

The present system may more clearly align the interests of business, backers, players and other participants in the cryptocurrency network. In the proposed system, the facilitator may receive its revenue via the selling of creatures and consumables on the marketplace store for use in the internal virtual economy which is powered by $DTBT. Businesses may be highly incentivized to grow the value of the network.

Players are incentivised to participate and to encourage other potential players to join. Early players may be expected to benefit from a larger network because the value of their $DTBT may be expected to appreciate in value as the network grows in size, and as the value of $DTB may increase for a given level of $DTB supply. Early adopters may also be expected to receive more $DTBT than later players because $DTBT may initially be issued at a lower fiat equivalent value of $DTB than when the fiat value may increase during the lifetime of the game.

Figure 2:
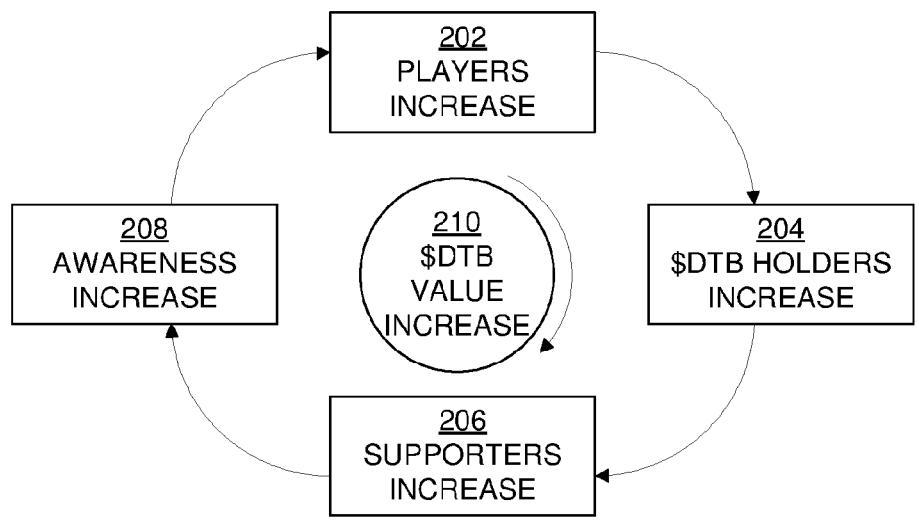
FIG. 2 shows a feedback loop illustrating how adoption of the present system may influence the value of cryptocurrency tokens.
Figure 3:
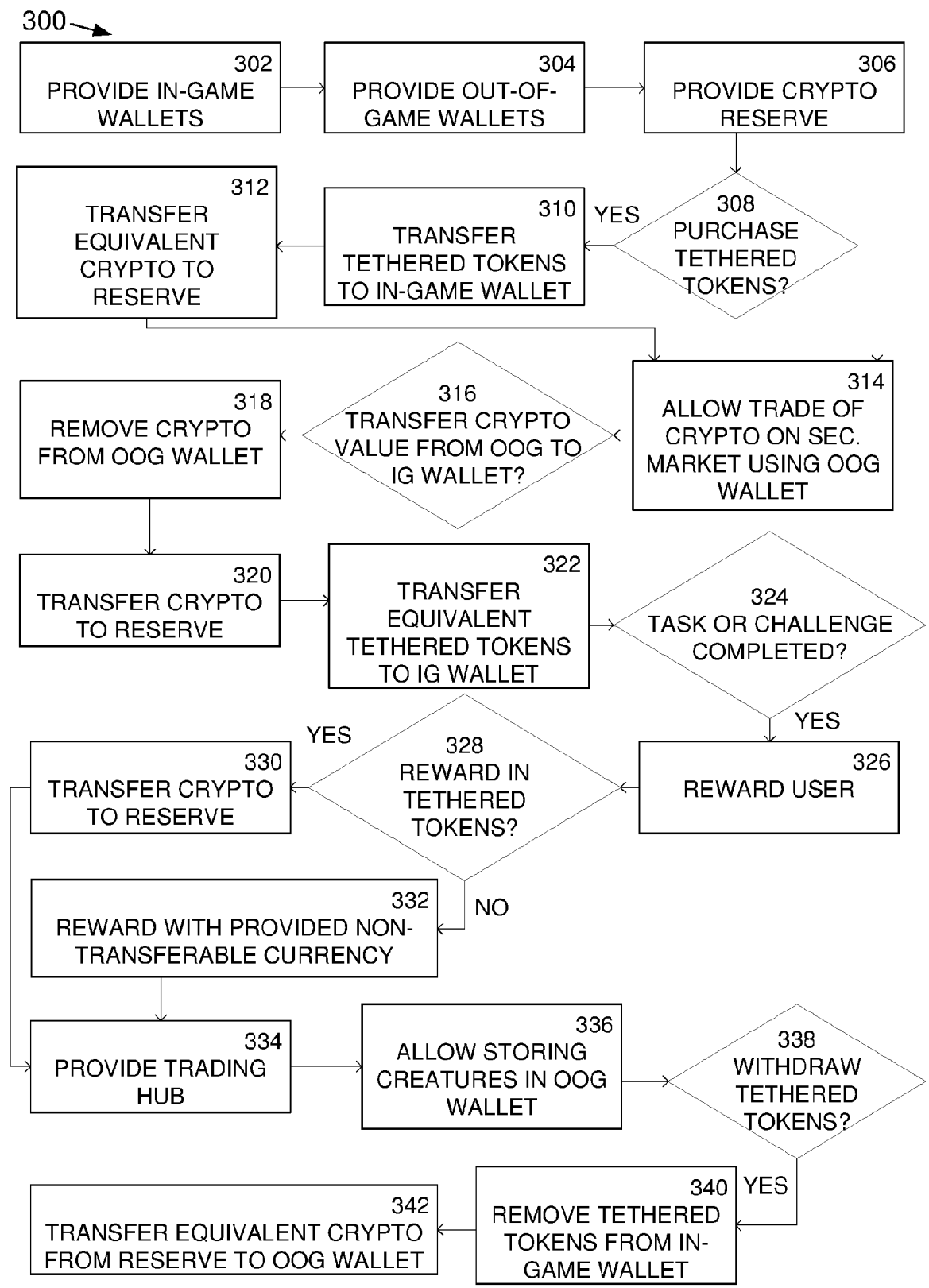
FIG. 3 is a flow diagram of a method for managing cryptocurrency according to the exemplary embodiment of the invention.

FIG. 2 shows a block diagram (200) of a feedback loop of how $DTB value may change. As the number of players of the game increases (202), the number of players holding an equivalent value of $DTB may increase (204). The players will themselves hold $DTBT, but their $DTBT will have a fixed $DTB equivalent, with the $DTB held in the cryptocurrency reserve. The supporters of the cryptocurrency system will therefore increase (206), and awareness of the cryptocurrency system will similarly increase (208). All of these may lead to an increase in demand for $DTB, which may in turn be expected to increase the price and value of $DTB for a given level of supply of $DTB.

It should be noted that the game should be fundamentally attractive, i.e. exciting and/or fun to play. The excitement factor of the game may be expected to serve as the primary incentive to play, rather than mere (potential) financial benefit. The link to cryptocurrency tokens by the in-game $DTBT required to play the game may be used as a marketing tool to attract new players. Such new players may make the game more "sticky", and may add to the network effects identified above. The addition of these new players may compensate for marketing costs as they produce a stable, healthy ecosystem of matches and/or games and supports.

The system (100) described above may implement a method for managing cryptocurrency. An exemplary method for managing cryptocurrency is illustrated in the flow diagram (300) of FIG. 3. In-game wallets are provided (302) to users, and out-of-game wallets are provided (304) to at least some of the users. A cryptocurrency reserve is also provided (306). If tethered digital tokens are purchased (308) by a user, tethered tokens are transferred (310) to the in-game wallet of the user. An equivalent value of cryptocurrency is transferred (312) to the cryptocurrency reserve. This equivalent value of cryptocurrency may be obtained by purchasing it from a secondary market.

As explained above, purchasing tethered digital tokens may occur as part of a package purchasing transaction, where a package containing tethered digital tokens, creatures and/or consumables are purchased and delivered to the in-game wallet of a user.

Users are allowed (314) to trade cryptocurrency on a secondary market using their out-of-game wallets. If a user wishes to transfer (316) a specific value of cryptocurrency to their in-game wallets from their out-of-game wallets, they may do so via an Internet-based or web portal. Cryptocurrency to the desired value is removed (318) from their out-of-game wallet, and is transferred to the cryptocurrency reserve. An equivalent value of tethered digital tokens is then transferred (322) to the user's in-game wallet.

When a user has completed (324) a task or challenge, they may be rewarded (326) and the equivalent value of cryptocurrency tokens is transferred (330) to the cryptocurrency reserve. This equivalent value of cryptocurrency may again be obtained by purchasing it from a secondary market. If the reward is not in the form of tethered digital tokens, it may be in the form of non-transferrable digital currency, which may also be stored in the user's in-game wallet. The user may be rewarded (322) with such non-transferrable digital currency.

A trading hub or trading platform or trading forum is provided (334) which may be used by users to trade, auction, bet on, sell and buy creatures and/or consumables within the gaming environment. Users are allowed to store (336) their creatures in their out-of-game wallets by transferring it there by using the web portal.

If a user wishes to withdraw (338) tethered tokens to a specific value from their in-game wallet, they may also do so via the web portal. In response to a user instructing such withdrawal, the specific value of tethered tokens is provided by the user. That number of tethered tokens is then removed (340) from their in-game wallet. Cryptocurrency of an equivalent value is then transferred (342) from the cryptocurrency reserve to the user's out-of-game wallet.

It will be apparent that the total value of cryptocurrency held in the cryptocurrency reserve will remain the same as the total value of tethered digital tokens held in the in-game wallets of users. By purchasing cryptocurrency tokens required to be transferred to the cryptocurrency reserve, a continuous demand for the cryptocurrency tokens may be ensured. While the secondary market value of the tokens may fluctuate, the number of tethered digital tokens that a user may obtain via purchasing a package from the marketplace store may differ. The same value of cryptocurrency as the user may be able to purchase in tethered digital tokens with their package, will be spent by the marketplace store on the secondary market. The tethered digital tokens remain linked in value to the cryptocurrency tokens, so users' cryptocurrency will not change in value while they use their tethered tokens in the gaming environment. At any time, they may withdraw the value of the cryptocurrency from the cryptocurrency reserve by trading in their tethered tokens, providing them with the same value of cryptocurrency tokens that they had in tethered tokens' value.

Should the secondary market value of the cryptocurrency tokens increase, one may expect a user to be rewarded with less tethered digital tokens upon completion of tasks or challenges in the game, as the less tokens may have a similar monetary equivalent value.

It is envisaged that the present marketplace environment, or gaming environment, may be facilitated by an application operating on an electronic device of a user. The marketplace environment may also be internet-based and may be provided within a browser.

Various components may be provided for implementing the method described above with reference to FIG. 3. FIG. 4 is a block diagram which illustrates exemplary components which may be provided by a system for managing cryptocurrency according to the invention. The system is hosted on a server (400) in the present embodiment.

The server (400) may include a processor (402) for executing the functions of components described below, which may be provided by hardware or by software units executing on the server (400). The software units may be stored in a memory component (404) and instructions may be provided to the processor (402) to carry out the functionality of the described components. In some cases, for example in a cloud computing implementation, software units arranged to manage and/or process data on behalf of the server (400) may be provided remotely.

The server (400) includes an in-game wallet component (406) arranged to provide each of a plurality of users with an in-game wallet suitable for storing tethered digital tokens, presently $DTBT, that is required to transact on a digital marketplace platform. The $DTBT is linked to cryptocurrency tokens, presently $DTB, according to a fixed relationship. An out-of-game wallet component (408) is arranged to provide at least some of the users with an out-of-marketplace wallet which is suitable for storing cryptocurrency tokens outside of the marketplace platform.

A cryptocurrency reserve component (410) is provided and is arranged to provide a cryptocurrency reserve suitable for storing a plurality of cryptocurrency tokens. A linked digital token transferring component or tethered digital token transferring component (412) is provided and is arranged to, responsive to a user purchasing tethered digital tokens from a marketplace store, transfer tethered digital tokens to the user's in-marketplace wallet. It is further arranged to, responsive to a user withdrawing a number of tethered digital tokens from their in-marketplace wallet, remove the desired number of tethered digital tokens from the user's in-marketplace wallet. A cryptocurrency token transferring component (414) is provided and is arranged to, responsive to the tethered digital token transferring component transferring tethered digital tokens to the user's in-marketplace wallet, transfer an equivalent value of cryptocurrency tokens to the cryptocurrency reserve. It is further arranged to transfer an equivalent value of cryptocurrency tokens from the cryptocurrency reserve to the user's out-of-marketplace wallet responsive to the tethered digital token transferring component removing the tethered digital tokens from the user's in-marketplace wallet.

The marketplace store may be provided by a marketplace component (416). A cryptocurrency purchasing component (418) is provided and is arranged to purchase cryptocurrency tokens from the secondary market at a prevailing secondary market value. This provides cryptocurrency tokens to the cryptocurrency token transferring component so that it may transfer cryptocurrency tokens to the cryptocurrency reserve when required.

A secondary market cryptocurrency component (420) is provided and arranged to allow a user to add cryptocurrency tokens purchased on the secondary market and outside of the marketplace platform to their out-of-marketplace wallet. It is also arranged to allow a user to sell cryptocurrency tokens held in their out-of-marketplace wallet on the secondary market. An out-of-marketplace to in-marketplace transferring component (422) is provided and arranged to, responsive to a user transferring a value of a specific number of cryptocurrency tokens from their out-of-marketplace wallet to their in-marketplace wallet, remove the specific number of cryptocurrency tokens from their out-of-marketplace wallet, transfer the cryptocurrency tokens to the cryptocurrency reserve, and transfer an equivalent value of tethered digital tokens to the user's in-marketplace wallet.

A package component (424) is provided and is arranged to allow a user to purchase a package from the marketplace store. The package may be comprised of tethered digital tokens, creatures, consumables or the like as described above.

A reward component (426) may be provided and may be arranged to reward a user with tethered digital tokens after successful completion of a task or challenge by the user. When the reward component (426) rewards a user with tethered digital tokens, the cryptocurrency token transferring component (414) may be further arranged to transfer an equivalent value of cryptocurrency tokens to the cryptocurrency reserve.

The server (400) may include a trading platform or trading forum or a trading hub component (428), which may be arranged to provide a trading hub to users. The trading hub may allow user to exchange, sell, auction, bid on and buy creatures and/or consumables. A digital asset transferring component (430) (in an embodiment in the form of a creature transferring component) may be provided and may be arranged to transfer a digital asset (such as a creature) between an in-marketplace wallet (in this instance an in-game wallet) and an out-of-marketplace wallet (in this instance an out-of-game wallet).

A marketplace access component (432) may be provided and may be arranged to limit access to specific areas of the marketplace based on an amount of tethered digital tokens held in the in-game wallet of a user.

A non-transferrable currency component (434) may be provided for providing a non-transferrable in-marketplace currency which is storable in the in-game wallet. A non-transferrable currency reward component (436) may be arranged to reward the user with a predetermined amount of the non-transferrable in-marketplace currency after successful completion of a task, challenge or the like.

The server (400) is but one example of an electronic device on which various aspect of the present invention may be implemented. It is envisaged that other electronic device, for example mobile electronic devices, personal computers, laptop computers, gaming stations or the like may be used to access, interact with and partake in the above cryptocurrency system.

The present cryptocurrency system enables $DTB, via a new type of tether thereto, to benefit from the size of the network. The new tether structure, which powers the in-game economy, creates defined value and utility for the cryptocurrency token. Linking $DTB to the in-game economy of virtual goods in the proposed manner may result in $DTB being a dependent of the network value. Incentives may be considered more aligned, as the new system creates complementary effects that may cause positive feedback loops in the network. Additionally, a token value that is clearly dependant on the network size may create a stable network that grows organically and may provide long-term price stability. A token with a clearer link to the network value and that provides price stability may maintain a long-term sustainable price that benefits all relevant shareholders or stakeholders.

FIG. 5 is a schematic diagram which illustrates an exemplary system (100A) for managing cryptocurrency in an online marketplace platform, an online gaming platform in the present embodiment. The system includes an in-marketplace wallet, presently an in-game wallet (102A), and an out-of-marketplace wallet, presently an out-of-game wallet (104A), of a user. An online marketplace store, presently an online gaming platform store (106A), forms part of the system (100A). A cryptocurrency token reserve (108A) is also provided.

It is envisaged that each user of the online gaming platform will be provided with an in-game wallet (102A) in order to transact on the marketplace, in the present embodiment being to partake in the game supported by the gaming platform. The in-game wallet (102A) may store $DTB and characters with which the game may be played. In the game, a user may only be allowed to transact using $DTB, which they may purchase (110A) from the reserve (108A) using fiat currency, for example US dollars. Purchasing $DTB from the reserve (108A) and in the game may incur a transactional fee from a provider of the operating platform on which the game is played, for example Apple™ or Google™. $DTB may then be used to purchase (112A) items such as potions (114A) or characters (116A) usable to play the game from the gaming platform store (106A).

The gaming platform store (106A) may top up (118A) the reserve (108A) with $DTB spent by users at the store (106A), while the $DTB spent may be used to fund the game itself. A user may be provided with an out-of-game wallet that may also be used to store $DTB and characters. This out-of-game wallet may be a newly created wallet specifically configured and adapted to store $DTB only, or it may be a pre-existing wallet of the user which may be configured to store different types of cryptocurrency at the same time. To this end, "providing" a user with an out-of-game wallet may include "associating" an existing out-of-game wallet of the user with their in-game wallet. A user may purchase (120A) $DTB from a secondary market (122A), which may then be added to their out-of-game wallet (104A). The user may exchange any form of currency for $DTB on the secondary market (122A), including, but not limited to, fiat currency or another form of cryptocurrency. In FIG. 5, it is illustrated to be fiat currency in the form of US dollars.

It is envisaged that the secondary market (122A) may originally be supplied by initial backers (124A) of $DTB during an initial coin offering phase and that may wish to sell (126A) their $DTB. Again, the backers (124A) may sell their $DTB in exchange for any fiat currency, such as US dollars of the present example, or may accept any other form of cryptocurrency. The gaming store (106A) may also sell (128A) $DTB on the secondary market in exchange for fiat currency, presently shown as US dollars, or may sell it for any other form of cryptocurrency.

The cryptocurrency reserve (108A) may be used to stabilize or manage the value of $DTB in-game. The reserve may purchase (129A) $DTB from the secondary market (122A) to maintain a constant $DTB price for a specific time period. The gaming store (106A) can sell a creature at a fixed fiat currency-based price inside the game, for example a creature costs US$10 worth of $DTB, or 100$DTB at US$0.1 per $DTB.

The reserve (108A) may be topped up by the operator purchasing $DTB at the prevailing market rate. The reserve (108A) may in this manner allow for a controlled change in the price of $DTB without significant price fluctuations. Additionally, the price at which $DTB may be purchased inside the game may be fixed for set periods of time, before being re-adjusted. Users may be informed as to when this price change will occur to provide the users with certainty over the cost of $DTB purchases in-game. It will be apparent that an increase in $DTB cost when purchased from a user's in-game wallet (104A) will also influence the secondary market (122A) value of $DTB.

Figure 6:
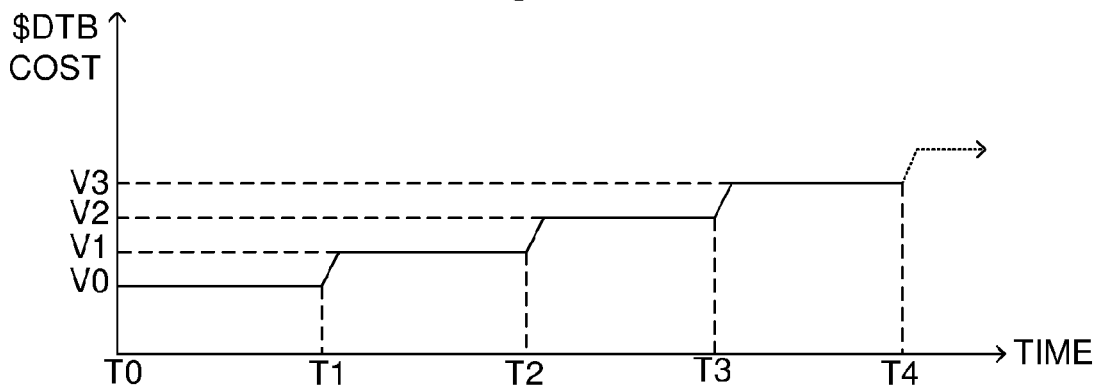
FIG. 6 is a graph showing a change of desired secondary market value of cryptocurrency tokens of the present invention.

FIG. 6 shows a graph representing a possible value of $DTB over time using this system. Initially and at time T0, the value of $DTB is V0. After time period T1, the desired value rises to V1. By operating the reserve by buying $DTB from the secondary market and adjusting a cost of $DTB when purchased from the reserve as described above, the value of $DTB may be adjusted to reach V1. Similar price increases may continuously occur at times T2, T3, T4 and the like, to obtain corresponding values V2, V3, and V4. This may limit speculation by parties buying up significant amounts of $DTB in order to hoard the currency and wait for the price to rise rapidly, as the secondary market price thereof may be managed. It is envisaged that, eventually, price stability may be reached once initial speculation and market fluctuations have settled. Then, the reserve may even become redundant as the in-game price of $DTB may be the same as the stable, secondary market price.

Referring back to FIG. 5, when a user wishes to transfer (130A) $DTB from their in-game wallet (102A) to their out-of-game wallet (104A), they may be charged a withdrawal fee (132A). The withdrawal fee may be based on the difference between the secondary market price of $DTB and the current price of $DTB charged by the reserve for purchasing the $DTB in-game. This may make it less or not at all beneficial for someone such as a speculator, to purchase $DTB in the game and withdraw it to their out-of-game wallet in order to hoard $DTB. The withdrawal fee may be collected by the gaming store (106A) or by the reserve (108A), as per operator preference, and may comprise a percentage of the value of $DTB that is transferred. By charging a withdrawal fee, speculators may be dissuaded from purchasing and hoarding $DTB, thereby driving up the price thereof on the secondary market. This may increase the suitability of $DTB as a game-specific cryptocurrency, as users are not disincentivized from keeping $DTB in their in-game wallet. Additionally, as the tokens are required to play and transact in the game, the tokens have a utility, which may be absent in games where fiat currency is used to transact in the game.

It will be apparent that creatures transferred from a user's in-game wallet (102A) to their out-of-game wallet (104A) for storage purposes may not incur a withdrawal fee. To transfer (134A) $DTB from an out-of-game wallet (104A) to an in-game wallet (102A) will preferably not incur any withdrawal or other form of transactional fees. This may allow a user that purchased $DTB on the secondary market (122A) to send those $DTB to its in-game wallet (102A) without incurring additional costs. An original backer (124A), however, may be enabled to transfer $DTB to their own out-of-game wallet without incurring a transactional fee.

It should be noted that original backers (124A) are not charged any form of transactional fees, as their purchase occurred outside of the in-game wallet. Users may not have a concern with purchasing $DTB from the backers (124A), as they will be able to transfer (134A) the $DTB from their out-of-game wallets (104A) to their in-game wallets (102A) without incurring any transactional fees. Then, the users may use the $DTB to play and transact in the game as the $DTB is intended for.

A specific in-game currency may also be provided, for example "Silver". This may be a digital game credit that is not tokenized and non-transferable. Silver may be purchasable with $DTB from a user's in-game wallet (102A), or may be offered as a reward to a user in response to the user completing a quest or challenge in the game, completing a battle, unlocks certain add-ons to the game, or the like. Silver may be usable to purchase consumables, such as potions or the like which may be usable in the game. Silver may function as a standard virtual in-game currency. By offering silver as a reward, players may still be able to play the game without spending fiat currency to obtain $DTB. It is only when the players desire to spend fiat currency to obtain $DTB that they may buy more silver and use it in the game without earning it as a reward.

It will be apparent that most of the components of the system described above may be provided in the form of digital components existing on some form of electronic device such as a server system. It will be apparent that these digital components may exist on a single server, on distributed servers, on any form of cloud servers or the like as is known in the art. Notably, the wallets (102A, 104A), reserve (108A) and gaming store (106A) are necessarily digitally-based and exist in digital format.

Figure 7:
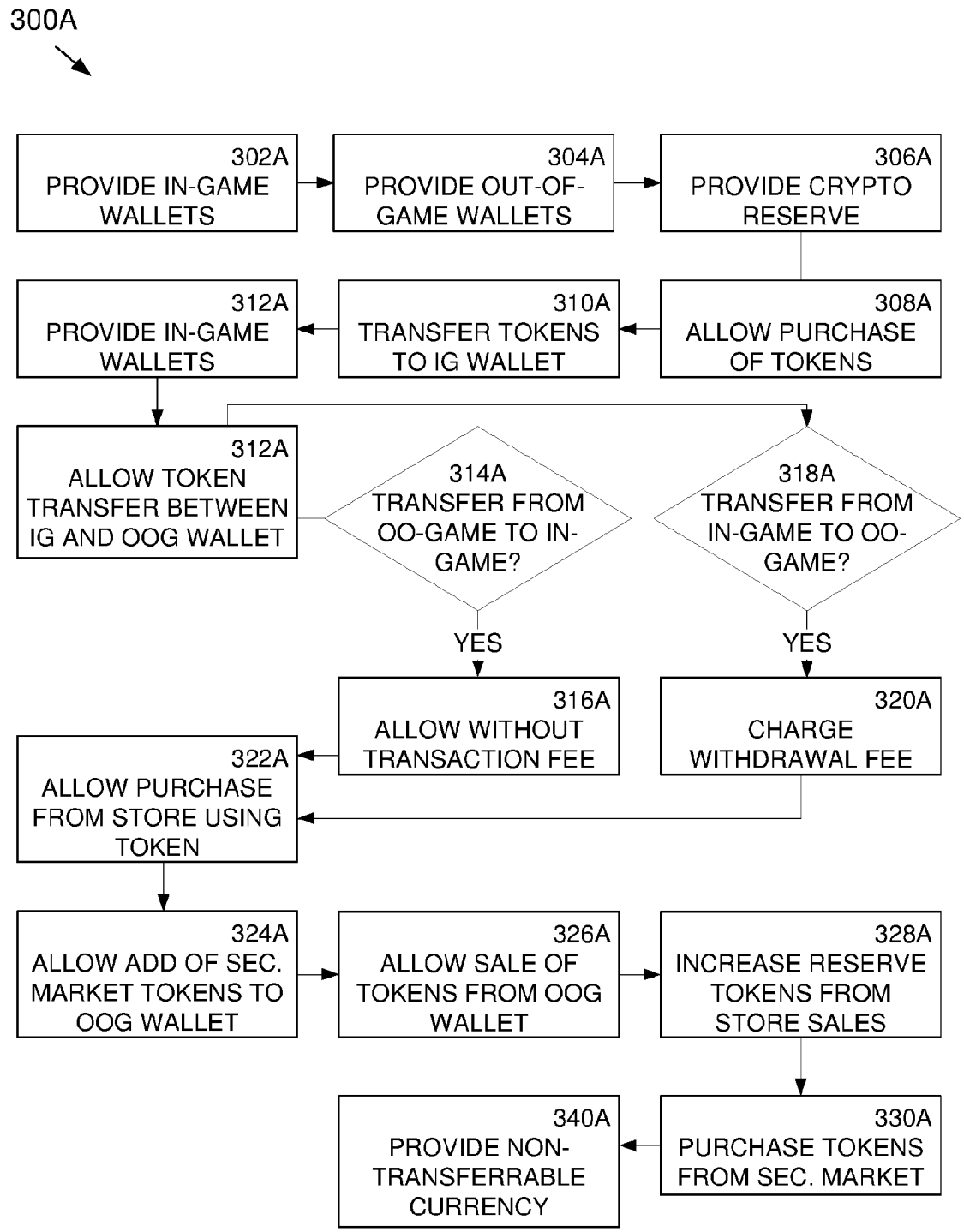
FIG. 7 is a flow diagram of a method for managing cryptocurrency according to the exemplary embodiment of the invention.

The system described above may implement a method for managing cryptocurrency. An exemplary method for managing cryptocurrency is illustrated in a flow diagram (300A) shown in FIG. 7. It will be apparent to a person skilled in the art that the order of steps forming part of the method need not be in the same order shown in FIG. 7. The method for managing cryptocurrency described below is described with reference to an online marketplace platform in the form of an online gaming platform supporting an online game, such as that described above with reference to FIGS. 5 and 6. Each of a plurality of users are provided (302A) with an in-game wallet. The in-game wallets may be off-chain wallets (which means not on the blockchain), and are suitable for storing $DTB required to transact with a gaming store of a digital gaming platform. At least some of the users may be provided (304A) with an out-of-game wallet, envisaged to be on-chain wallets (which means on the blockchain), that are suitable for storing $DTB outside of the gaming platform.

A cryptocurrency token reserve is provided (306A) that is suitable for storing a plurality of $DTB. A user may be allowed (308A) to purchase $DTB for their in-game wallet using fiat currency, responsive to which the purchased $DTB is transferred (310A) from the cryptocurrency reserve to the user's in-game wallet. A user is allowed (312A) to transfer $DTB between their out-of-game wallet to their in-game wallet, and if a user transfers (314A) $DTB from their out-of-game wallet to their in-game wallet the transaction is allowed (316A) without transaction fees. If a user transfers (318A) $DTB from their in-game wallet to their out-of-game wallet, they are charged (320A) a withdrawal fee. Users are allowed (322A) to purchase items from the gaming store using fiat currency, are allowed (324A) to add $DTB purchased on the secondary market and outside of the game to their out-of-game wallet, and are allowed (326A) to sell $DTB held in their out-of-game wallet on the secondary market. During operation of the cryptocurrency system, the amount of $DTB in the cryptocurrency reserve is increased (328A) by transferring $DTB received as payment by the gaming store thereto. A desired secondary market value of $DTB is determined by an operator of the cryptocurrency system. The reserve may purchase (330A) $DTB from the secondary market at a prevailing secondary market value in order to maintain the price of $DTB on the in-game market. A non-transferrable in-game currency may be provided (340A) which may be purchasable in exchange for $DTB and may be stored in the user's in-game wallet. The non-transferrable in-game currency may be usable to transact with whilst playing the game, and a predetermined amount thereof may be provided to a user as a reward in response to completing a task, challenge or the like.

While the above examples have been directed specifically at gaming-based platforms, it will be appreciated that the present invention may be equally well applied to any cryptocurrency marketplace platforms as described above. The present invention may reduce the strength of the economic incentives to delay consumption or use in deflationary cryptocurrency systems, as tokens are not destroyed. This may limit hoarding by persons waiting for the value of their tokens to increase. The reserve of the present invention serves as a monetary policy tool, which may reduce wild fluctuations in the price of an in-marketplace cryptocurrency. The fluctuating tendency of cryptocurrencies with relatively small floats is a significant drawback which may prevent adoption thereof by general users and limiting this tendency may have significant advantages to users. The withdrawal fee may prevent arbitrage opportunities, which should further stabilize prices. As a whole, this may allow cryptocurrency to be a stable in-marketplace currency, which should promote its acceptance and use.

It may be desired that the value of tokens should be a function of the size of the network, following what is known in the art as Metcalf's law (which states that the value of a telecommunications network is proportional to the square of the number of connected users of the system). In the presently proposed system, the value of the token and the value of the network is aligned, as the more users take part in the marketplace, the more demand for the cryptocurrency should be, as cryptocurrency is required to transact on the marketplace. This was not the case in previously known cryptocurrency systems, particularly in gaming-specific platforms.

Additionally, the present cryptocurrency system enables network participation for the holder, as a user must own cryptocurrency if they wish to transact on the marketplace. In the above examples where a gaming platform is provided, cryptocurrency is required to, for example, purchase a creature to play the game with. This provides clear utility to the tokens. The presently proposed system may align interests of an operating entity, original backers, as well as users of the cryptocurrency system and its associated network. The operator may derive its revenue from the internal virtual cryptocurrency economy, which means that the operator is highly incentivised to stabilise and grow the value of the network and cryptocurrency. Players are incentivised to participate and grow the network by encouraging other players to join network and, in the above examples, play the game. In the proposed system, early players will benefit from a larger network due to an increase in opportunities to play the game with other users & a possible increase in the value of the cryptocurrency, as the network grows in size.

It is envisaged that the specific cryptocurrency tokens, $DTB in the examples above, may be used as a marketing tool to invite new players due to its nature of in-marketplace currency. The additional players may contribute to the overall size of the network and its associated advantages. Various components may be provided for implementing the method described above with reference to FIG. 7. FIG. 8 is a block diagram which illustrates exemplary components which may be provided by a system for managing cryptocurrency in an online gaming platform according to the invention. The system is hosted on a server (400A).

The server (400A) may include a processor (402A) for executing the functions of components described below, which may be provided by hardware or by software units executing on the server (400A). The software units may be stored in a memory component (404A) and instructions may be provided to the processor (402A) to carry out the functionality of the described components. In some cases, for example in a cloud computing implementation, software units arranged to manage and/or process data on behalf of the server (400A) may be provided remotely. The server (400A) includes an in-game wallet component (406A) arranged to provide each of a plurality of users with an in-game wallet suitable for storing $DTB required to transact with a gaming store of a digital gaming platform. An out-of-game wallet component (408A) is arranged to provide at least some of the users with an out-of-game wallet suitable for storing $DTB outside of the gaming platform. A wallet free transferring component (410A) is arranged to, responsive to a user transferring $DTB from their out-of-game wallet to their in-game wallet, allow the transaction without transaction fees. A wallet withdrawal fee component (412A) is arranged to, responsive to a user transferring $DTB from their in-game wallet to their out-of-game wallet, charge the user a withdrawal fee.

A reserve component (414A) is arranged to provide a cryptocurrency reserve suitable to store a plurality of $DTB therein. A token transferring component (416A) is arranged to, responsive to a user purchasing $DTB for their in-game wallet using fiat currency, transfer the purchased $DTB from the cryptocurrency reserve to the user's in-game wallet. A cryptocurrency token increasing and transmitting component (418A) is arranged to increase the number of cryptocurrency tokens in the cryptocurrency reserve by transferring cryptocurrency tokens received as payment by the gaming store thereto, while a cryptocurrency purchasing component (420A) is arranged to purchase cryptocurrency tokens from the secondary market at a prevailing secondary market value.

An out-of-game purchase component (422A) is arranged to allow a user to purchase items from the gaming store outside of the game using fiat currency, and the out-of-game wallet component (408A) is also arranged to allow a user to add cryptocurrency tokens purchased on the secondary market and outside of the game to their out-of-game wallet, and also to allow a user to sell cryptocurrency tokens held in the out-of-game wallet on the secondary market. A non-transferrable currency component (424A) is arranged to provide a non-transferrable in-game currency storable in the user's in-game wallet and purchasable in exchange for cryptocurrency tokens. The non-transferrable in-game currency is usable to transact with whilst playing the game. A non-transferable currency reward component (426A) is arranged to, responsive to a user completing a task, challenge or the like in the game, reward the user with a predetermined value of the non-transferrable in-game currency.

It should be appreciated that the various components described with reference to an in-game environment may also be provided in other environments that are not game-based. Examples include online forums and marketplaces or other websites as will be discussed below.

FIG. 9 illustrates an example of an electronic device (500) in which various aspects of the disclosure may be implemented. The electronic device (500) may be embodied as any form of data processing device including a personal electronic device (e.g. laptop or desktop computer), a server computer (which may be self-contained, physically distributed over a number of locations), a client computer, or a communication device, such as a mobile phone (e.g. cellular telephone), satellite phone, tablet computer, personal digital assistant or the like. Different embodiments of the electronic device may dictate the inclusion or exclusion of various components or subsystems described below.

The electronic device (500) may be suitable for storing and executing computer program code. The various participants and elements in the previously described system diagrams may use any suitable number of subsystems or components of the electronic device (500) to facilitate the functions described herein. The electronic device (500) may include subsystems or components interconnected via a communication infrastructure (505) (for example, a communications bus, a network, etc.). The electronic device (500) may include one or more processors (510) and at least one memory component in the form of computer-readable media. The one or more processors (510) may include one or more of: CPUs, graphical processing units (GPUs), microprocessors, field programmable gate arrays (FPGAs), application specific integrated circuits (ASICs) and the like. In some configurations, a number of processors may be provided and may be arranged to carry out calculations simultaneously. In some implementations various subsystems or components of the electronic device (500) may be distributed over a number of physical locations (e.g. in a distributed, cluster or cloud-based computing configuration) and appropriate software units may be arranged to manage and/or process data on behalf of remote devices.

The memory components may include system memory (515), which may include read only memory (ROM) and random access memory (RAM). A basic input/output system (BIOS) may be stored in ROM. System software may be stored in the system memory (515) including operating system software. The memory components may also include secondary memory (520). The secondary memory (520) may include a fixed disk (521), such as a hard disk drive, and, optionally, one or more storage interfaces (522) for interfacing with storage components (523), such as removable storage components (e.g. magnetic tape, optical disk, flash memory drive, external hard drive, removable memory chip, etc.), network attached storage components (e.g. NAS drives), remote storage components (e.g. cloud-based storage) or the like.

The electronic device (500) may include an external communications interface (530) for operation of the electronic device (500) in a networked environment enabling transfer of data between multiple electronic devices (500) and/or the Internet. Data transferred via the external communications interface (530) may be in the form of signals, which may be electronic, electromagnetic, optical, radio, or other types of signal. The external communications interface (530) may enable communication of data between the electronic device (500) and other electronic devices including servers and external storage facilities. Web services may be accessible by and/or from the electronic device (500) via the communications interface (530). The external communications interface (530) may be configured for connection to wireless communication channels (e.g., a cellular telephone network, wireless local area network (e.g. using Wi-Fi™), satellite-phone network, Satellite Internet Network, etc.) and may include an associated wireless transfer element, such as an antenna and associated circuitry. The computer-readable media in the form of the various memory components may provide storage of computer-executable instructions, data structures, program modules, software units and other data. A computer program product may be provided by a computer-readable medium having stored computer-readable program code executable by the central processor (510). A computer program product may be provided by a non-transient computer-readable medium, or may be provided via a signal or other transient means via the communications interface (530).

Interconnection via the communication infrastructure (505) allows the one or more processors (510) to communicate with each subsystem or component and to control the execution of instructions from the memory components, as well as the exchange of information between subsystems or components. Peripherals (such as printers, scanners, cameras, or the like) and input/output (I/O) devices (such as a mouse, touchpad, keyboard, microphone, touch-sensitive display, input buttons, speakers and the like) may couple to or be integrally formed with the electronic device (500) either directly or via an I/O controller (535). One or more displays (545) (which may be touch-sensitive displays) may be coupled to or integrally formed with the electronic device (500) via a display (545) or video adapter (540).

This description has been presented for the purpose of illustration; it is not intended to be exhaustive or to limit the invention to the precise forms disclosed. Persons skilled in the relevant art can appreciate that many modifications and variations are possible in light of the present disclosure.

Any of the steps, operations, components or processes described herein may be performed or implemented with one or more hardware or software units, alone or in combination with other devices. In one embodiment, a software unit is implemented with a computer program product comprising a non-transient computer-readable medium containing computer program code, which can be executed by a processor for performing any or all of the steps, operations, or processes described. Software units or functions described in this application may be implemented as computer program code using any suitable computer language such as, for example, Java™, C++, or Perl™ using, for example, conventional or object-oriented techniques. The computer program code may be stored as a series of instructions, or commands on a non-transitory computer-readable medium, such as a random access memory (RAM), a read-only memory (ROM), a magnetic medium such as a hard-drive, or an optical medium such as a CD-ROM. Any such computer-readable medium may also reside on or within a single computational apparatus, and may be present on or within different computational apparatuses within a system or network.

In the above systems, the cryptocurrency reserve amount may be selected as a fixed ration (I.e. 1:1000 or 1 $DTB for 1000 $DTBT's). Another solution is to utilise token bonding. This is because token bonding may provide the ability to layer different economies on top of each other with a possibility of only the lower level needing to be tradable. It is believed that a dynamic curve of price-supply relationship may introduce unique aspects to token economies.

Figure 10:
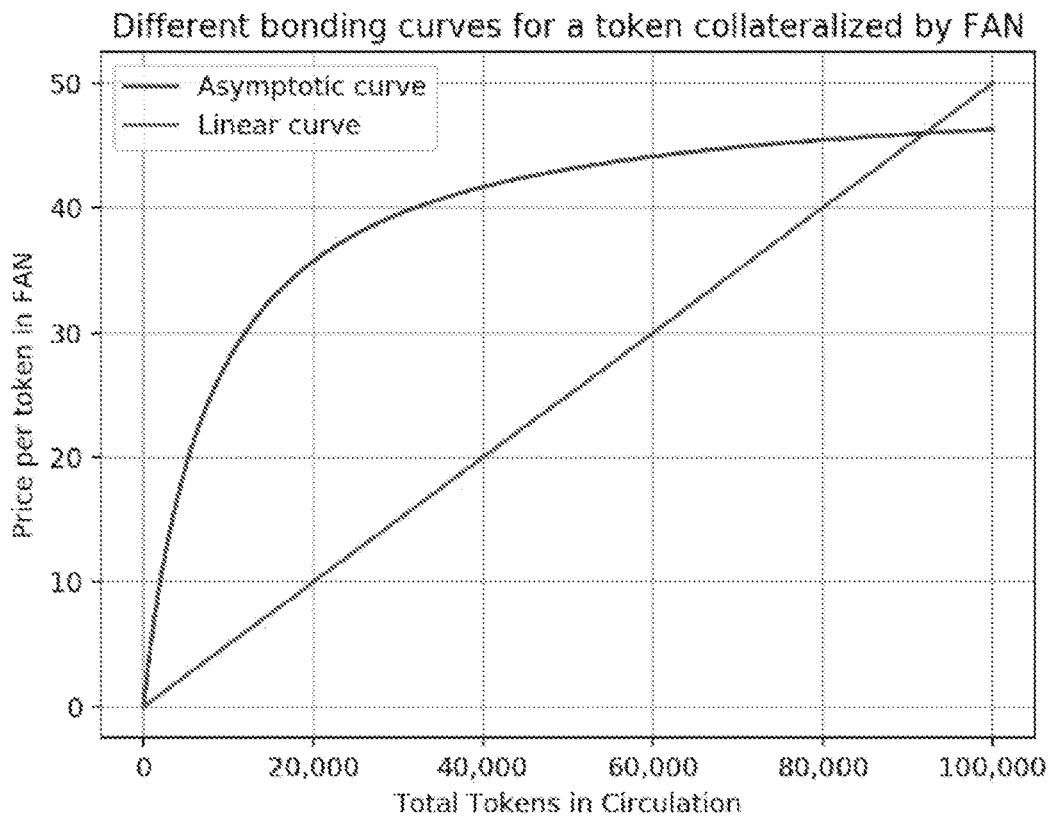
FIGS. 10, 11 are graphs illustrating examples of how bonding of tokens may be applied.
Figure 12:
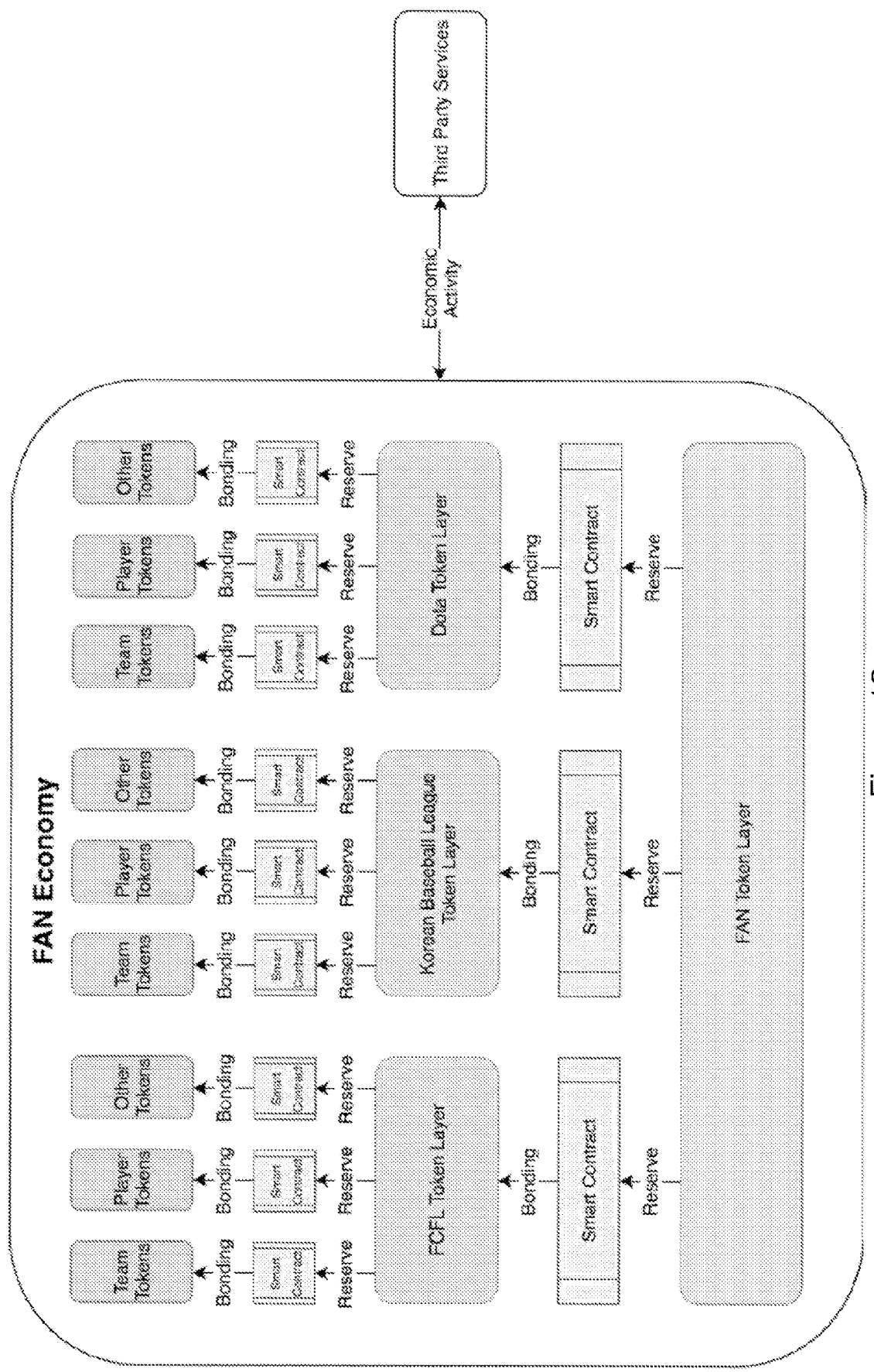
FIG. 12 is a high-level block diagram of a multi-layer and cross-platform economy utilising bonding and smart contracts.

In FIG. 10 is shown a graph illustrating an example embodiment of how bonding of tokens may be applied. FIG. 12 illustrates a system which may accommodate multiple types of sports/esports leagues, giving the creators of these leagues as much autonomy as is possible in designing their functionality. To achieve a system like this which has a functional, underlying economy, a concept called token bonding may be used to introduce a hierarchy of tokens which may all fundamentally be related to each other. The system may be designed for native or third-party services to naturally interact with consumers on an appropriate (token) layer.

Token bonding is a means of token generation with a predefined price-supply relationship or curve. This may be achieved through a smart contract: users deposit a reserve currency into the smart contract address, and in turn receive newly-minted tokens. The deposit may be locked up, to be returned to sellers of the token at a later date. The price the user pays per token may be dictated by the aforementioned curve. At any point, users may be able to exchange their minted tokens for the original reserve currency at a price dictated by the same curve (there are more complex variants as well, where the sell and buy curves are distinct). Usually, the predefined curve is increasing, which means early purchasers of a token, which then becomes popular, may be able to sell their cheaply-acquired tokens for potentially more later on. Additionally, any bonded token may be 100% collateralized by the native token, so all deposited tokens are locked up by the smart contract. This provides guaranteed liquidity to any token that is bonded. Bonded tokens may form an economy where the supply and demand price curves may be fixed and known (and may be tangible) and macroeconomic factors, such as inflation, may be consequences of these curves. Token Bonding can be used to signal demand for various products which all live in the same network.

Referring to FIG. 10, for an additional x tokens to be purchased, the smart contract may look up the appropriate point on the curve based on existing circulating supply and determine the amount to be paid in the native token for the bundle of x tokens to be generated. A similar process may be provided for selling tokens (which destroys these tokens by removing them from circulation, and moving the total token supply backward along the bonding curve). Since the token may be 100% collateralized, the system may provide enough reserve currency stored to compensate the sold tokens. Examples of bonding "curves" may be a straight line (gradient >0) or asymptotic. The bonding curves may be designed to be a cost-effective form for a smart contract to compute, such as:

$$\frac{x}{c(a+x^b)}$$

This process can be abstracted from consumers through a purchasing app. Users may indicate how many tokens or which service they would like to purchase, and a computation using the curve may reflect the cost. At the same time, while being simplified for users, the system design of token-bonded economies may enable natural entry layers for different types of services. This may make it easier for both technical integration of services and for an understanding of the flow of the economic activity in the network (since all bonded token creation or destruction may be visible on the blockchain, and transactions using a certain token may be more likely to reflect a specific type of economic activity). It is envisaged that a multi-layer economy may be provided to reflect a diverse ecosystem. Using a layered system may eliminate the need for an "in-house" trading platform to facilitate exchange of the different token types. Smart contracts may be utilised, while demand may still be reflected in the token bonding curves. In certain sections onward the word "cycle" may be used to denote a base time interval to be used in the system, through which things like seasons, voting and any other time-related events can be denominated. This word reflects an arbitrary value, but may be fixed for whatever is chosen.

Referring to FIG. 12, in an example embodiment a "FAN economy" may be built upon a "FAN token layer" (main layer or upper layer). It will be appreciated that "FAN" is a name chosen for a token which comprises an upper layer in a layered tokenized economy, with lower layers being bonded to the FAN layer utilising bonding and smart contracts. Lower level tokens such as the "FCFL token layer" (FCFL being an abbreviation for "Fan Controlled Football League") and the Korean Baseball League Token Layer are examples of lower level tokens which are bonded to the upper layer (FAN token layer). This may enable users to use the upper layer across various online platforms. The lower layers or derived layers of bonded tokens are derived from the main/upper layer. The FAN Token may be functionally related to others tokens in the economy and any derivative tokens (FCFL tokens, Dota Tokens etc.) may be able to be denominated in FAN tokens. FAN tokens may be traded on external exchanges.

While forming the foundation of the entire economy of the FAN ecosystem, the FAN token may have utility itself for numerous activities:

Usage as a common store of value within the ecosystem. If a user interacts with multiple leagues or wants to access multiple different services, they can simply keep a large store of FAN tokens on their wallet. They will then easily be able to convert these to the appropriate token at will.

Some services may directly interact on the FAN token layer. A league-agnostic betting service, for example, or any service linked to user accounts would accept FAN tokens as payment.

Ecosystem governance may be managed by the FAN token. While the system will initially incorporate many centralized aspects, the vision is for an entire ecosystem of multiple leagues to be governed decentrally by fans. The fundamental decisions of this ecosystem, which may apply to the way leagues are allowed to structure their own tokens and decide if there are any delegated roles, will be made through voting mechanisms utilizing the FAN token.

FAN tokens may be the primary driver of the gamification and participation incentivization of the network. As will be described in further detail below, a reward engine may be developed around the FAN token, and subsequently filtered through to leagues (or token layers), to encourage content creation and facilitate rewards to the wide variety of actors in the system which perform work.

In the proposed model the FAN token may not necessarily be bought through a smart contract (which is effectively a form of bonding to some other reserve currency). Instead, the FAN token may be released with an initial supply. A fixed amount of tokens may be added to the system periodically. These may be added through a reward engine, to ensure a foundational amount of income to incentivize participation in the network. This is unlikely to diminish the value of the token as the ecosystem grows, as it may be decreasing inflation and may asymptotically approach 0%.

The league token layer may be provided on top of the FAN token layer and may allow for league-specific tokens to be introduced to facilitate appropriate incentives and economic activity for that league. The structure of this may be designed to accommodate a wide variety of use cases and league types. League tokens may be bonded to FAN tokens. This structure may allow league owners to control the league both technically and conceptually. They may hence be enabled to control:

The bonding curve used to bond to FAN tokens. This may dictate the price-supply curve of the token. As the creators of the smart contract they will be able to purchase the first tokens (the amount of which will reflect their investment in the ecosystem), effectively being able to seed their league's "sub-ecosystem" with these tokens or holding them as an investment to be sold when token demand increases. They will not need to worry about any technical mechanics regarding marketplaces as the token bonding contract will be the marketplace for their token.

The scope of fundamental use of their token in the league. They will have complete control of their token's purpose through the initial services they offer in the system, which will be paid for using the league token. This could include features such as betting, purchasing of league-specific card packs, or league governance.

Which features of their potentially existing league may be exposed to the FAN ecosystem. Established leagues may want to remain largely centralized, but may still be enabled to use their league token as an entrypoint to provide functionality.

The type of governance used for their league. In the creation of the initial smart contracts they may effectively be able to dictate how voting works in the ecosystem as well as other network parameters. This may encourage exploration of new decentralized models as well as allowing leagues to uniquely find what works for them.

By having a league token for each league, data may be available for that particular economy to be consumed by the league in an easily obtainable form. Additionally, once the FAN token's price reaches an equilibrium point, the league token's value may be directly related to the league's value itself and will be shielded from the activities of other leagues directly. While there may still be a functional relationship between different league tokens through the FAN token layer, demand may be more accurately reflected in each token. The direct uses of league tokens may be at the discretion of league owners and third party services which offer services to specific leagues. The league token may act as a gateway (through bonding) to tokens with more granular use cases in the league. Each league token may be used for any league-wide activities. This may include betting, governance of certain aspects of the league or more social interactions between league participants. Fantasy leagues for the particular league could be incorporated on top of the layer, perhaps additionally interacting with player tokens bonded to the league token. Gamification and rewards may be used to reflect content creation specific to the league using the league token. Further examples of bonded tokens that may be used include team tokens and player tokens.

It is envisaged that a token may be bonded for each team in the league. This means there may be a clear reflection of the demand for each team's token and, by extension, the support for each team. It may also encourage fairer distribution of support among all teams in the league, as those with fewer supporters will likely have cheaper tokens (assuming the bonding curves are the same for each).

Figure 13:
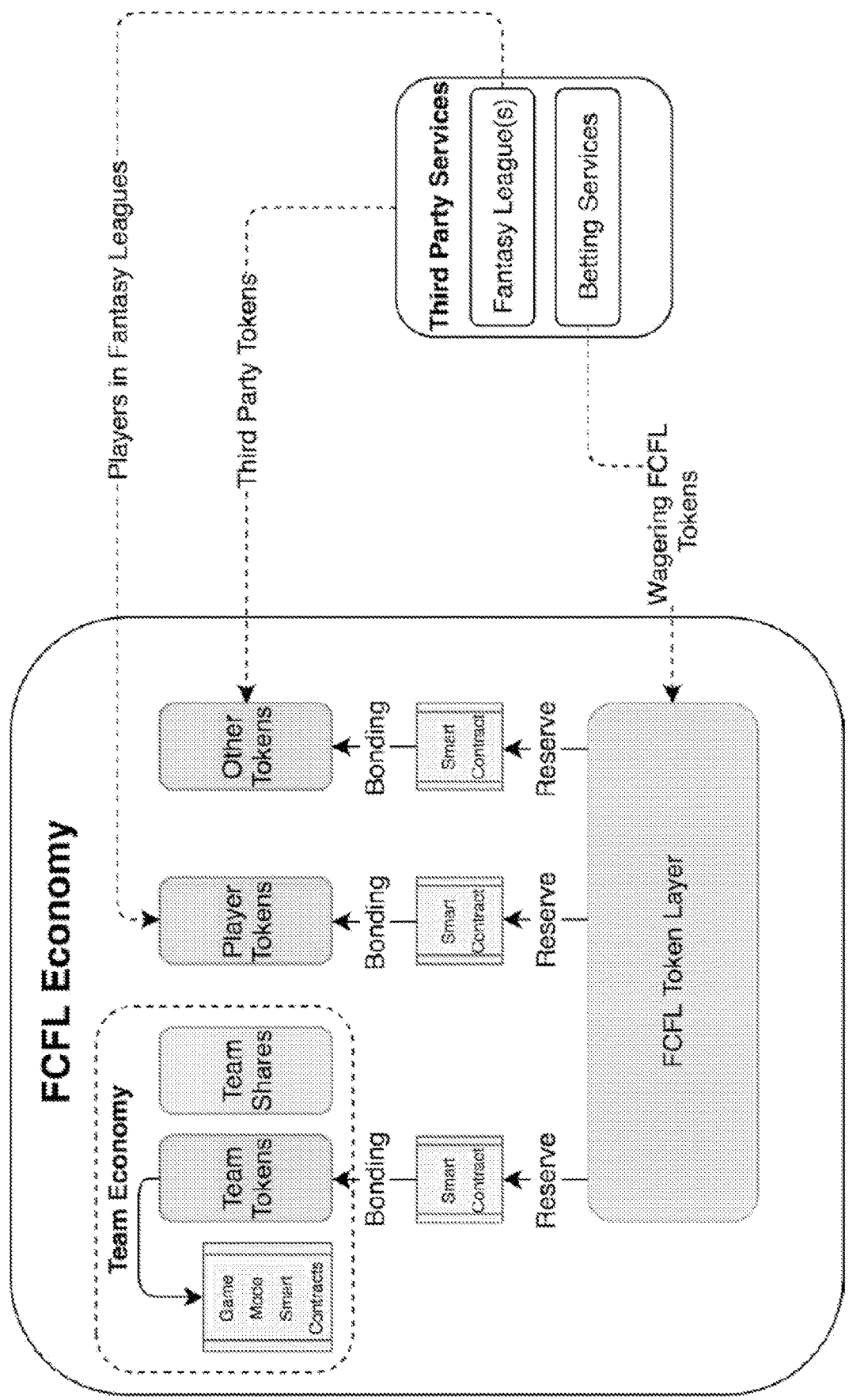
FIG. 13 is a high-level block diagram illustrating the functionality of one of the layers in FIG. 12.

As is shown in FIG. 13, a Fan-Controlled Football League (FCFL) is provided as an example of a league to join the FAN ecosystem. This may be a league with eight teams competing for a winning prize of for example $1,000,000. In this example there is outlined the structure of the FCFL as a template for the ecosystem as a whole. Governance aspects of the FCFL may be provided on the various levels, including League-wide governance, Reward system governance and Team governance. The FCFL Token may be the league token of the FCFL. All economic activity occurring within the league may utilize either the FCFL token or one of its bonded derivatives. Apart from the obvious use case as a foundational token, the FCFL Token may also have a use case for third party services provided to FCFL users but are not specific to specific teams. This could be betting services and purchasing league-themed goods, among other things. The FCFL token may also be used for staking in any voting mechanisms which are implemented at the league layer, which may be provided by "League Governance".

Team Tokens may be provided and may form the foundation of the FCFL and may facilitate a multitude of interactions within the FCFL. Users may be able to purchase tokens for a particular team through a smart contract bonded to FCFL tokens. They may be able to sell these tokens at will, as well, though might want to hold them if they expect support for the team, and therefore demand for the token, to increase since this will drive up the price through the token bonding curve.

In another embodiment of the invention there is provided a system of providing a cryptoeconomic system across a plurality of forums, trading hub(s) or platforms which system may be conveniently termed "Tapatalk". There is envisaged a token-based ecosystem, with each forum owner managing their forum's economy and potentially designing their own token backed by TAPs. This network may be introduced with no disruption to existing functionality and may be at the discretion of forums themselves how they want to interact with TAPx. This may be useful in forums or online platforms such as interest forums, trading forums, product-related forums etc. Objectives of this token may include: enabling users to control their privacy and foster their identity in the forum ecosystem; enabling forum stakeholders with greater tools for self-governance; facilitating economic activities within and across forums and augment existing marketplaces by expanding opportunities for new services by leveraging network effects of the ecosystem; and increasing engagement by all forum stakeholders through tokenization.

A token may hence be introduced to the forum ecosystem: to enable users to transact with each other and to access goods and services; to encourage the expansion of service offerings in the forum ecosystem; to grant sufficiently large forums greater economic autonomy; to gamify the forums and to boost engagement using the token system as incentive mechanisms for user and/or moderator behaviors.

Figure 11:
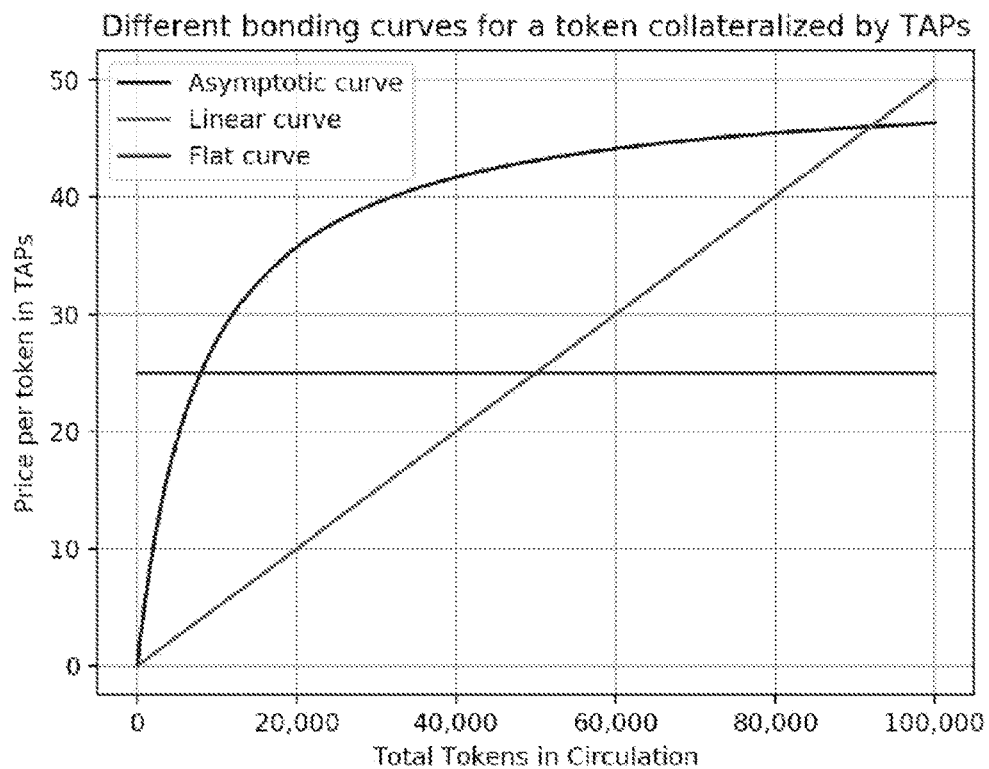

Token bonding as described above with inter alia reference to FIG. 10, may be implemented with the TAPx token using smart contracts. The TAPx network may enable forum owners to use the native TAP token, but also to issue their own unique forum token. The TAPx network may enable this by providing a token bonding mechanism for forum owners to create their own forum tokens that may be bonded to the TAP token. A forum may need to be identified as part of a network which may be termed "a Tapatalk network" to be able to issue their own forum token. The forum owner (who manages the forum's TAPx blockchain identity) may be able to initiate the creation of their forum-branded token and purchase these new tokens first using TAPs, which may be the reserve currency. This may enable them to use these branded tokens in the same ways to incentivize behavior as you could with the native TAPs token on their own forums. The forum owner may also be able to decide on the predefined bonding curve used to determine the token buy/sell price (as a function of total token supply) from a set of options available to them during the token creation process. After the token is created and the bonding curve is selected, anyone may be able to purchase these new tokens using their own TAPs or a credit card and a trivial behind the scenes system that converts fiat into the bonded token. A similar graph to FIG. 10 is shown in FIG. 11, illustrating an example implementation of TAPs which may also follow an asymptomatic relationship, or a straight line as described above. This may provide a forum economic ecosystem with a relatively simple conversion between the forum token and TAPs, so that individual forums may be able to function as they always have and have the autonomy to dictate whether their internal economies are run on TAPs or branded forum tokens.

Example use cases include: a) Incentive models for forums: A forum owner can spend a small amount on tokens to be used as rewards for certain activities on their forums. This may generate more user activity and produce more quality content. This translates to more pageviews and ultimately more profits for the forum owner. At the same time, users benefit from the ability to reward each other and from the higher quality content produced via these incentives. The forum could also offer virtual goods which could be obtained either via reputation or through spending the branded token. Users could buy tokens themselves for this purpose or use rewards received from the forum owner. These virtual goods could be certain additional rights (temporary or permanent) or a cosmetic theme or sticker that is rare or limited.

b) Selling Access, Avatars, and Features: Forum system and their features are based on user permissions. Forum owners can choose to assign token value for each permission to let end users to use token to purchase and obtain special permission. For example, forum owners can charge a small token to let ordinary members to pin their thread to the top (to increase the visibility of their own discussion), to allow user to change their username handle, or even to upgrade their user status to become premium members, or moderators in the forum. In order to fund their purchase of TAPs for use on the forums, forum owners may also sell virtual tokenized assets such as profile avatars and badges.

c) As a trading currency: For classified-style forums, users may be able to use either TAPs or their own branded currency for trading. Using these crypto-tokens to purchase items may enable faster transaction confirmations at lower cost than via traditional electronic payments and can be publicly confirmed as valid without the possibility of chargebacks. The blockchain is particularly useful for trading digital items or virtual goods. E.g. purchasing a high-resolution image from a fellow passionate photographer, or a creature skin from a fellow gamer. Users may be able to buy these tokens to use themselves, or cash-out tokens received as rewards or payment. The total value of tokens spent inside the forum may be a much clearer indicator of the size of the forum economy, whose data is presently very difficult to obtain. Forum owners could also benefit by implementing a fee for every transaction involving the branded token, for the purposes of offsetting forum hard costs and increasing forum profitability.

d) Ad-Free Browsing: In order to maximize revenue, forum owners are tempted to progressively add more advertisements to their website. This, in turn, leads to a distracting user experience that is slow to load, which leads to a decline in user engagement. Some forum owners have resorted to installing a paywall for premium content, others would sell ad-free subscriptions, but the majority of advertising efforts lack traction, flexibility, adoption, and only works with a specific site and with poor result. A possibility is offering a USD $5 per month equivalent of TAPs tokens for VIP access to all online forums ad-free, an alternative business model is created. The amount is then fairly distributed to each individual participating site, which is based on a range of different interaction and content metrics. As more forums participate, the program becomes attractive due to the network effect. This model may be similar to US cable TV subscriptions, which support more channels every month while users pay the same fee and can only consume so much content per day. With the TAPx token economy, combined with the Identity system, it is finally possible to create an Ad-Free browsing membership that evenly works among all participating forums. Users can use TAPs token to purchase or upgrade memberships.

e) Peer to Peer Marketplace: Forums are one of the largest untapped online marketplaces of goods and services. The diversity of topics covered by forums allows for a robust classified marketplaces curated and used by enthusiasts. Many vendors and dealers also participate in these subforums, offering their goods to a very targeted group of users. For example, in forums related to fish tanks, you may find members selling goods, alongside small vendors who deal in live coral or other exotic species. None of these sellers are large enough to aggregate enough niche users on larger marketplaces, such as Ebay or Craigslist. Forums are often the best or only places to advertise and sell certain goods, but the issues of trust, reputation, transaction fees, and fragmentation have posed challenges to growing the size of this economy. A classified marketplace built on top of the forum blockchain can address these challenges.

In the following reference implementation the workings of the TAPx token bonding infrastructure is explained. Let's expand on how a specific forum owner could implement a localised token economy through bonding their own token to TAPs. Let's use Something Fishy, a fictitious forum supporting the community around Salt Water aquariums. Alice, the forum owner, selects one of the default TAPx bonding curves. Alice decides that she prefers the benefits of an asymptotic function. An asymptotic curve represents an economy where early adopters will be rewarded, with the overall bonding price later tending toward a stable equilibrium. The default curve is $$f(x) = \frac{x}{c(a+x^b)} \text{ where } a > 0; 0.5 < b < 1; c > 1$$

In order to derive the price at which users would buy and sell tokens, compute the general integral of the above mentioned function:

$$\int \frac{x}{(a+x^b)c} dx = \frac{x^2 {}_2F_1\left(1, \frac{2}{b}; \frac{b:2}{b}; -\frac{x^b}{a}\right)}{2ac}$$

In this case, $_2F_1$ (a, b; c; x) is the hypergeometric function. The complexity surrounding this function will be suitably hidden from the user. The user will simply see a price and graphic indicating the current buy/sell point on a graphic. The default parameters (although completely configurable by the forum owner to achieve a more complex token ecosystems) would be a=10 000, b=0.9, c=10 in which case the first 100,000 FISH bonded tokens bought would cost a total of 16,799 TAPs. This is easily computed from the above integral.

Figure 14:
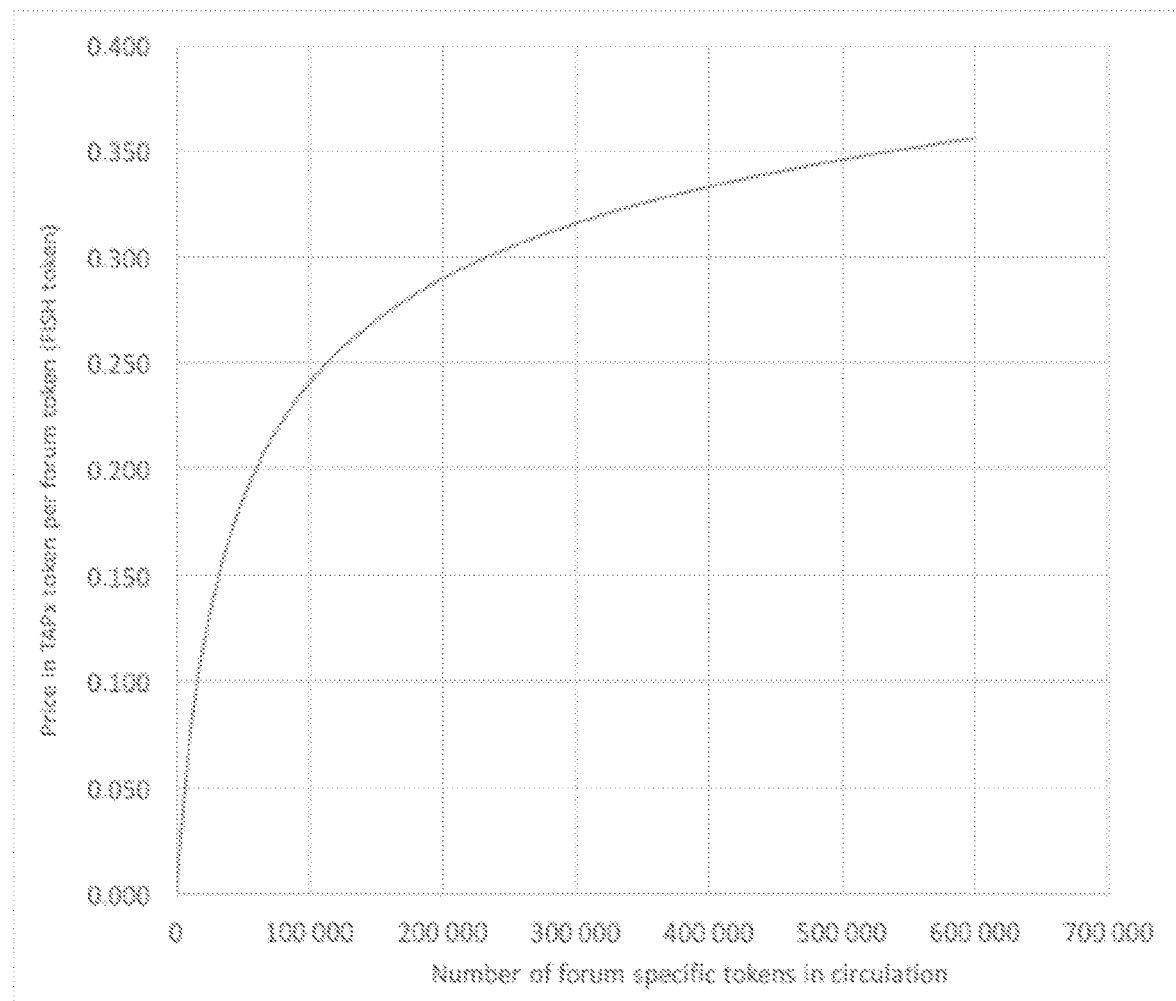
FIG. 14 is an example graph of a price curve of exemplary tokens.

The graph in FIG. 14 shows the suggested configuration above with the price in TAPx per FISH token on the y-axis, versus the token number on the x-axis. For example, the 100,000th token bought or sold, would cost approximately 0.25 TAPx, and the 500,000th token bought or sold, would cost approximately 0.35 TAPx. This bonded curve represents the opportunity for the early adopters to pay a lower TAPs prices for FISH tokens compared to late adopters. Importantly, the function gradient is such that the price discrepancy between respective buyer groups will not be drastic enough to deter late adopters of the token.

The forum has question-specific bounties to incentivize users to answer important questions. These are specific questions that require acute domain knowledge or require a urgent answer and will have a 'bounty' attached to them. The higher the bounty, the faster the question should be addressed ceteris paribus. Let's walk through the following implementation to illustrate the process. E.g. Bob, a user, posts a specific question: "What is the ideal pH level of the water for a tank with RockFish?" with a bounty of 10 FISH to this question, as the forum indicates that a 10 FISH question typically receives a good answer in 6 hours. The actual mechanics of how this bounty will be stored and distributed are as follows. The default bounty period is 48 hours, but it can be extended or reduced. During this period, Bob stakes the 10 FISH tokens upfront, which will be held by a smart contract during this period of time.

There is provided a token security system which is conveniently termed a "Deep Defense" system. This is a high-level overview of the proposed Deep Defence token economy. The token economy was designed with the target of decentralization.

The Deep Defence network or lattice is a combination of different devices called nodes that are all monitoring each other in order to provide an AI-based cybersecurity system. In principle, each Node broadcasts its telemetry data to a few other randomly selected nodes on the network. In turn, the node also receives telemetry data from other nodes. Nodes use an AI model to detect if any node that they are monitoring is compromised. This creates a lattice of nodes that are all monitoring each other making it exponentially harder to compromise any one device on the system. In practise, for the foreseeable future, there will be many different lattices, each of which is running different AI models that are optimised to a specific device or software. E.g. Android phones will monitor and protect each other, or be monitored and protected by supernodes. There are also supernodes that run many different versions of AI and connect to multiple nodes on different lattices. These supernodes will interweave the entire system together In order for the system to work, the correct behaviour may be incentivized. For example, the Nodes should be incentivized to remain active on the system and the Auditors should be incentivized to perform audits at the highest level. The token economy is the mechanism which achieves this, it uses the ARMR token to achieve this objective. A single token model, denoted by ARMR is proposed.

Token bonding is also described above. Token Bonding in the Deep Defence context will be used to signal demand for various products which all live in the same network. For example, there may be heightened demand for smartphone analytics as opposed to fridge analytics and by having bonded tokens for consumption of each, the network distributes the value of the demand to the appropriate subnetwork. For an additional x tokens to be purchased, the smart contract will lookup the appropriate point on the curve based on existing circulating supply and determine the amount to be paid in the native token for the bundle of x tokens to be generated. A similar process will work for selling tokens (which ultimately destroys these tokens by removing them from circulation, and moving the total token supply backward along the bonding curve). Since the token may be 100% collateralized, there will always be enough ARMR stored to compensate those selling their tokens. Computationally cost-effective straight line (with gradient >0) or asymptotic relationships (such as those in FIGS. 10 and 11 may be used (with ARMR instead of FAN for example)) may be used. This process can be abstracted from consumers through a purchasing app. Users will simply describe how many tokens or which threat analytics they would like to consume, and a computation using the curve can immediately reflect the cost.

In this model, threat analytics is purchased using the native token, ARMR. In this instance, bonding is a viable option for different classes of threat analytics. Therefore, more highly-demanded threat analytics will cost more. For example, threat analytics associated with Samsung devices may require its own token (bonded to ARMR) for purchases, perhaps denoted SMG-ARMR, which has its own price curve. Bonding can also be used for staking in AI selection or for staking within the network, as both these activities are device-specific and have their own "subnetworks". All purchases may be required to purchase ARMR from either the Nodes or AI developers and auditors. Therefore, income for a system is proportional to the quality of threat analytics generated.

Flowchart illustrations and block diagrams of methods, systems, and computer program products according to embodiments are used herein. Each block of the flowchart illustrations and/or block diagrams, and combinations of blocks in the flowchart illustrations and/or block diagrams, may provide functions which may be implemented by computer readable program instructions. In some alternative implementations, the functions identified by the blocks may take place in a different order to that shown in the flowchart illustrations.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. The described operations may be embodied in software, firmware, hardware, or any combinations thereof.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims. Finally, throughout the specification and claims unless the contents requires otherwise the word 'comprise' or variations such as 'comprises' or 'comprising' will be understood to imply the inclusion of a stated integer or group of integers but not the exclusion of any other integer or group of integers.

The invention claimed is:

1. A computer-implemented method for managing cryptocurrency comprising:
   providing each of a plurality of users with an in-marketplace wallet, the in-marketplace wallet suitable for storing linked digital tokens that are linked and bonded in value to cryptocurrency tokens and that are required to transact on a digital marketplace platform;
   providing a cryptocurrency reserve suitable for storing a plurality of cryptocurrency tokens;
   responsive to a user purchasing digital tokens from a marketplace store, linking digital tokens, wherein the linking comprises:
      receiving, by a smart contract, an amount of cryptocurrency from a user;
      retrieving, by the smart contract, data relating to a pre-defined price-supply relationship between the digital tokens and the cryptocurrency and determining a price for the digital tokens using the pre-defined price-supply relationship;
      generating, by the smart contract, a number of linked digital tokens based on the determined price;
      transferring the number of linked digital tokens to the in-marketplace wallet of the user and transferring an equivalent value of cryptocurrency tokens to the cryptocurrency reserve; and
   responsive to the user withdrawing the number of linked digital tokens from the in-marketplace wallet of the user, removing the desired number of linked digital tokens from the user's in-marketplace wallet and transferring an equivalent value of cryptocurrency tokens from the cryptocurrency reserve to an out-of-marketplace wallet of the user, the out-of-marketplace wallet suitable for storing cryptocurrency tokens outside of the marketplace platform.

2. A method as claimed in claim 1, wherein the bonded tokens comprise a plurality of layered bonded tokens wherein a main layer is provided and derived layers of bonded tokens are derived from the main layer, the derived layers of bonded tokens each being arranged to be used in a different digital marketplace platform.

3. A method as claimed in claim 1, wherein the step of transferring cryptocurrency tokens of an equivalent value to the cryptocurrency reserve includes purchasing cryptocurrency tokens from a secondary market at a prevailing secondary market value.

4. A method as claimed in claim 3, wherein the method includes the steps of allowing a user to add cryptocurrency tokens purchased on the secondary market and outside of the marketplace platform to the out-of-marketplace wallet of the user and to sell cryptocurrency tokens held in the out-of-marketplace wallet of the user on the secondary market; and, responsive to a user transferring a value of a specific number of cryptocurrency tokens from the out-of-marketplace wallet of the user to the in-marketplace wallet of the user, removing the specific number of cryptocurrency tokens from the out-of-marketplace wallet, transferring the cryptocurrency tokens to the cryptocurrency reserve, and transferring an equivalent value of bonded digital tokens to the user's in-marketplace wallet.

5. A method as claimed in claim 4, wherein the digital marketplace platform is a digital gaming platform; wherein the marketplace store is a gaming store; wherein the in-marketplace wallet is an in-game wallet; and wherein the out-of-marketplace wallet is an out-of-game wallet.

6. A method as claimed in claim 4, wherein the method is implemented in an online forum platform and wherein the in-marketplace wallet is associated with the online forum platform.

7. A method as claimed in claim 4, wherein the cryptocurrency tokens are blockchain-based tokens, and wherein the bonded digital tokens are non-blockchain-based tokens.

8. A method as claimed in claim 4, wherein the method includes the step of, responsive to a user completing a task, challenge or the like in the marketplace platform, rewarding the user with a predetermined number of bonded digital tokens.

9. A method as claimed in claim 4, wherein the method includes the steps of: providing a trading hub; allowing a user to exchange digital assets for bonded digital tokens or for other digital assets on the trading hub.

10. A method as claimed in claim 9, wherein the method further includes allowing a user to offer a digital asset on the trading hub; allowing users to bid on an offered digital asset; and, responsive to a first trader trading a digital asset for bonded digital tokens or other digital assets of a second trader, transferring the digital asset and the bonded digital tokens between the in-marketplace wallets of the first and second traders.

11. A system for managing cryptocurrency, the system including a memory for storing computer-readable program code and a processor wherein the code, when executed by the processor, causes the processor to perform the steps of:
providing each of a plurality of users with an in-marketplace wallet, the in-marketplace wallet suitable for storing linked and bonded digital tokens that are linked in value to cryptocurrency tokens and that are required to transact on a digital marketplace platform;
providing a cryptocurrency reserve suitable for storing a plurality of cryptocurrency tokens;
responsive to a user purchasing digital tokens from a marketplace store, linking digital tokens, wherein the linking comprises:
receiving, by a smart contract, an amount of cryptocurrency from a user;
retrieving, by the smart contract, data relating to a pre-defined price-supply relationship between the digital tokens and the cryptocurrency and determining a price for the digital tokens using the pre-defined price-supply relationship;
generating, by the smart contract, a number of linked digital tokens based on the determined price;
transferring the number of linked digital tokens to the in-marketplace wallet of the user and transferring an equivalent value of cryptocurrency tokens to the cryptocurrency reserve;
responsive to the user withdrawing a number of linked digital tokens from the in-marketplace wallet of the user, removing the desired number of linked digital tokens from the user's in-marketplace wallet; and
responsive to the linked digital token transferring component transferring linked digital tokens to the user's in-marketplace wallet, transferring an equivalent value of cryptocurrency tokens to the cryptocurrency reserve and for, responsive to removing the linked digital tokens from the user's in-marketplace wallet, transferring an equivalent value of cryptocurrency tokens from the cryptocurrency reserve to an out-of-marketplace wallet of the user, the out-of-marketplace wallet suitable for storing cryptocurrency tokens outside of the marketplace platform.

12. A computer program product for managing cryptocurrency, the computer program product comprising a non-transitory computer-readable medium having stored computer-readable program code that, when executed by a processor, causes the processor to perform the steps of:
providing each of a plurality of users with an in-marketplace wallet, the in-marketplace wallet suitable for storing linked digital tokens that are linked and bonded in value to cryptocurrency tokens and that are required to transact on a digital marketplace platform;
providing a cryptocurrency reserve suitable for storing a plurality of cryptocurrency tokens;
responsive to a user purchasing digital tokens from a marketplace store, linking digital tokens, wherein the linking comprises:
receiving, by a smart contract, an amount of cryptocurrency from a user;
retrieving, by the smart contract, data relating to a pre-defined price-supply relationship between the digital tokens and the cryptocurrency and determining a price for the digital tokens using the pre-defined price-supply relationship;
generating, by the smart contract, a number of linked digital tokens based on the determined price;
transferring the number of linked digital tokens to the in-marketplace wallet of the user and transferring an equivalent value of cryptocurrency tokens to the cryptocurrency reserve; and
responsive to the user withdrawing the number of linked digital tokens from the in-marketplace wallet of the user, removing the desired number of linked digital tokens from the user's in-marketplace wallet and transferring an equivalent value of cryptocurrency tokens from the cryptocurrency reserve to an out-of-marketplace wallet of the user, the out-of-marketplace wallet suitable for storing cryptocurrency tokens outside of the marketplace platform.

\* \* \* \* \*